(12) United States Patent
Sawai et al.

(10) Patent No.: US 10,779,168 B2
(45) Date of Patent: *Sep. 15, 2020

(54) TRANSMISSION POWER DETERMINATION METHOD, COMMUNICATION DEVICE AND PROGRAM

(71) Applicant: Sony Corporation, Tokyo (JP)

(72) Inventors: Ryo Sawai, Tokyo (JP); Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,883

(22) Filed: Mar. 19, 2019

(65) Prior Publication Data

US 2019/0215703 A1 Jul. 11, 2019

Related U.S. Application Data

(63) Continuation of application No. 15/703,247, filed on Sep. 13, 2017, now Pat. No. 10,405,200, which is a (Continued)

(30) Foreign Application Priority Data

Jul. 31, 2009 (JP) ................................. 2009-179367
Jan. 13, 2010 (JP) ................................. 2010-005230
May 12, 2010 (JP) ................................. 2010-110012

(51) Int. Cl.
*H04W 24/00* (2009.01)
*H04W 52/24* (2009.01)
(Continued)

(52) U.S. Cl.
CPC ........... *H04W 24/00* (2013.01); *H04W 24/02* (2013.01); *H04W 52/146* (2013.01);
(Continued)

(58) Field of Classification Search
CPC ..... H04W 16/14; H04W 24/00; H04W 24/02; H04W 52/143; H04W 52/146;
(Continued)

(56) References Cited

U.S. PATENT DOCUMENTS 5,537,610 A 7/1996 Mauger et al.
5,832,379 A 11/1998 Mallinckrodt
(Continued)

FOREIGN PATENT DOCUMENTS

JP 2002-142249 A 5/2002
JP 2002-171283 A 6/2002
(Continued)

OTHER PUBLICATIONS

US 10,356,729 B2, 07/2019, Sawai et al. (withdrawn)
(Continued)

*Primary Examiner* — Tan H Trinh
(74) *Attorney, Agent, or Firm* — Wolf, Greenfield & Sacks, P.C.

(57) ABSTRACT

An electronic device comprising circuitry that controls transmitting signals through a first communication link toward a base station or a second communication link toward a mobile station. The second communication link uses an uplink resource of the first communication link. The circuitry determines transmission power for the second communication link based on a first parameter and a second parameter. The first parameter indicates a signal level, a power level, or a noise level in the first communication link. The second parameter corresponds to path loss information for the first communication link.

4 Claims, 19 Drawing Sheets

Related U.S. Application Data continuation of application No. 14/810,825, filed on Jul. 28, 2015, now Pat. No. 9,820,168, which is a continuation of application No. 13/655,002, filed on Oct. 18, 2012, now Pat. No. 9,131,387, which is a continuation of application No. 12/838,605, filed on Jul. 19, 2010, now Pat. No. 8,639,281.

(51) Int. Cl.
| | |
|---|---|
| *H04W 24/02* | (2009.01) |
| *H04W 52/46* | (2009.01) |
| *H04W 52/14* | (2009.01) |
| *H04W 52/16* | (2009.01) |
| H04W 16/14 | (2009.01) |

(52) U.S. Cl.
CPC ........... *H04W 52/16* (2013.01); *H04W 52/24* (2013.01); *H04W 52/241* (2013.01); *H04W 52/242* (2013.01); *H04W 52/245* (2013.01); *H04W 52/46* (2013.01); *H04W 16/14* (2013.01); *H04W 52/143* (2013.01); *H04W 52/243* (2013.01)

(58) Field of Classification Search
CPC ... H04W 52/16; H04W 52/24; H04W 52/241; H04W 52/242; H04W 52/243; H04W 52/245; H04W 52/46
USPC ...... 455/69, 522, 452.1, 436, 501, 561, 517, 455/560, 509; 370/252, 329; 375/130
See application file for complete search history.

(56) References Cited

U.S. PATENT DOCUMENTS

| | | | |
|---|---|---|---|
| 6,151,501 | A | 11/2000 | Belkin et al. |
| 6,385,462 | B1 | 5/2002 | Baum et al. |
| 6,438,379 | B1 | 8/2002 | Gitlin et al. |
| 6,628,639 | B1 | 9/2003 | Ishii |
| 6,748,246 | B1 | 6/2004 | Khullar |
| 6,845,246 | B1 | 1/2005 | Steer |
| 6,865,393 | B1 | 3/2005 | Baum et al. |
| 6,985,750 | B1 | 1/2006 | Vicknair et al. |
| 7,027,829 | B1 | 4/2006 | Laakso et al. |
| 7,146,176 | B2 | 12/2006 | McHenry |
| 7,193,978 | B2 | 3/2007 | Ishikawa et al. |
| 7,684,765 | B2 | 3/2010 | Song |
| 7,777,674 | B1 | 8/2010 | Haddadin et al. |
| 7,979,076 | B2 | 7/2011 | Hui et al. |
| 8,005,480 | B2 | 8/2011 | Ashish et al. |
| 8,160,626 | B2 | 4/2012 | Shan et al. |
| 8,249,631 | B2 | 8/2012 | Sawai |
| 8,265,684 | B2 | 9/2012 | Sawai |
| 8,391,794 | B2 | 3/2013 | Sawai et al. |
| 8,446,849 | B2 | 5/2013 | Damnjanovic |
| 8,521,087 | B2 | 8/2013 | Kim |
| 8,577,406 | B2 | 11/2013 | Sawai et al. |
| 8,588,829 | B2 | 11/2013 | Sawai |
| 8,639,281 | B2 | 1/2014 | Sawai et al. |
| 8,832,797 | B2 | 9/2014 | Ekl et al. |
| 8,908,952 | B2 | 12/2014 | Isaacs et al. |
| 8,937,872 | B2 | 1/2015 | Wu et al. |
| 8,958,810 | B2 | 2/2015 | Buddhikot et al. |
| 9,078,243 | B2 | 7/2015 | Sawai |
| 9,131,387 | B2 | 9/2015 | Sawai et al. |
| 9,137,761 | B2 | 9/2015 | Sawai |
| 9,215,670 | B2 | 12/2015 | Sawai et al. |
| 9,351,340 | B2 | 5/2016 | Ribeiro et al. |
| 9,363,767 | B2 | 6/2016 | Kimura |
| 9,380,575 | B2 | 6/2016 | Sawai |
| 9,510,302 | B2 | 11/2016 | Sawai et al. |
| 9,622,191 | B2 | 4/2017 | Kimura et al. |
| 9,661,587 | B2 | 5/2017 | Sawai |
| 9,775,119 | B2 | 9/2017 | Sawai et al. |
| 9,819,326 | B2 | 11/2017 | Low et al. |
| 9,820,168 | B2 | 11/2017 | Sawai et al. |
| 9,894,657 | B2 | 2/2018 | Kimura et al. |
| 9,999,085 | B2 | 6/2018 | Sawai |
| 10,104,625 | B2 | 10/2018 | Sawai |
| 10,306,564 | B2 | 5/2019 | Sawai et al. |
| 10,368,385 | B2 | 7/2019 | Sawai |
| 10,405,200 | B2* | 9/2019 | Sawai ................... H04W 52/24 |
| 10,405,283 | B2 | 9/2019 | Sawai et al. |
| 10,517,131 | B2 | 12/2019 | Sawai |
| 2001/0017882 | A1* | 8/2001 | Umeda ................. H04W 52/267 375/130 |
| 2001/0019543 | A1 | 9/2001 | Mueckenheim |
| 2002/0002052 | A1 | 1/2002 | McHenry |
| 2002/0002063 | A1* | 1/2002 | Miyamoto ............ H04W 36/18 455/560 |
| 2002/0120551 | A1 | 8/2002 | Jones, III |
| 2002/0197995 | A1 | 12/2002 | Starkovich et al. |
| 2003/0100312 | A1 | 5/2003 | Takahashi |
| 2003/0216143 | A1 | 11/2003 | Roese et al. |
| 2004/0063468 | A1 | 4/2004 | Frank |
| 2004/0246934 | A1 | 12/2004 | Kim |
| 2004/0253955 | A1 | 12/2004 | Love et al. |
| 2005/0003846 | A1 | 1/2005 | Matoba et al. |
| 2005/0202839 | A1 | 9/2005 | Matoba et al. |
| 2006/0040696 | A1 | 2/2006 | Lin |
| 2006/0063500 | A1 | 3/2006 | Matoba et al. |
| 2006/0063533 | A1 | 3/2006 | Matoba et al. |
| 2006/0093074 | A1 | 5/2006 | Chang et al. |
| 2006/0094363 | A1 | 5/2006 | Kang et al. |
| 2006/0223573 | A1 | 10/2006 | Jalali |
| 2006/0240859 | A1 | 10/2006 | Gervais et al. |
| 2006/0251115 | A1 | 11/2006 | Haque et al. |
| 2006/0262767 | A1 | 11/2006 | Peleg et al. |
| 2007/0041351 | A1 | 2/2007 | Hazra et al. |
| 2007/0042784 | A1 | 2/2007 | Anderson |
| 2007/0049214 | A1 | 3/2007 | Song |
| 2007/0049266 | A1 | 3/2007 | Voss |
| 2007/0104140 | A1 | 5/2007 | Ashish et al. |
| 2007/0117537 | A1 | 5/2007 | Hui et al. |
| 2007/0117558 | A1 | 5/2007 | Balwani |
| 2007/0129104 | A1 | 6/2007 | Sano et al. |
| 2007/0142087 | A1 | 6/2007 | Kim et al. |
| 2007/0147539 | A1 | 6/2007 | Gorokhov et al. |
| 2007/0149236 | A1 | 6/2007 | Naden et al. |
| 2007/0201412 | A1 | 8/2007 | Ji et al. |
| 2007/0213046 | A1 | 9/2007 | Li et al. |
| 2007/0223403 | A1 | 9/2007 | Furuskar et al. |
| 2007/0287469 | A1 | 12/2007 | Wiiting |
| 2008/0112361 | A1 | 5/2008 | Wu |
| 2008/0119215 | A1 | 5/2008 | Ji et al. |
| 2008/0130519 | A1 | 6/2008 | Bahl et al. |
| 2008/0146154 | A1 | 6/2008 | Claussen et al. |
| 2008/0146226 | A1 | 6/2008 | Claussen et al. |
| 2008/0175185 | A1 | 7/2008 | Ji et al. |
| 2008/0176595 | A1 | 7/2008 | Karaoguz |
| 2008/0208397 | A1 | 8/2008 | Miklos |
| 2008/0214127 | A1 | 9/2008 | Karmi et al. |
| 2008/0221951 | A1 | 9/2008 | Stanforth et al. |
| 2008/0232490 | A1 | 9/2008 | Gross et al. |
| 2008/0253324 | A1 | 10/2008 | Moulsley et al. |
| 2008/0268892 | A1 | 10/2008 | Hamdi et al. |
| 2008/0311957 | A1 | 12/2008 | Jantunen et al. |
| 2009/0005043 | A1* | 1/2009 | Claussen ............... H04W 24/02 455/436 |
| 2009/0011788 | A1 | 1/2009 | Shan et al. |
| 2009/0034508 | A1 | 2/2009 | Gurney et al. |
| 2009/0040986 | A1 | 2/2009 | Cordeiro et al. |
| 2009/0088083 | A1 | 4/2009 | Fujii et al. |
| 2009/0111388 | A1 | 4/2009 | Chen |
| 2009/0131082 | A1 | 5/2009 | Gast |
| 2009/0156247 | A1 | 6/2009 | Claussen et al. |
| 2009/0180521 | A1 | 7/2009 | Joseph et al. |
| 2009/0186608 | A1 | 7/2009 | Lee et al. |
| 2009/0186646 | A1 | 7/2009 | Ahn et al. |
| 2009/0191889 | A1 | 7/2009 | Abedi |
| 2009/0196180 | A1 | 8/2009 | Bahl et al. |
| 2009/0215452 | A1 | 8/2009 | Balasubrainanian et al. |
| 2009/0221297 | A1 | 9/2009 | Wengerter et al. |

(56) References Cited

U.S. PATENT DOCUMENTS

| | | |
|---|---|---|
| 2009/0232019 A1 | 9/2009 | Gupta et al. |
| 2009/0247201 A1 | 10/2009 | Ye et al. |
| 2009/0247204 A1 | 10/2009 | Sennett et al. |
| 2009/0253450 A1 | 10/2009 | Gupta |
| 2009/0258654 A1 | 10/2009 | Hagerman et al. |
| 2009/0264162 A1 | 10/2009 | Ramachandran et al. |
| 2009/0265543 A1 | 10/2009 | Khetawat et al. |
| 2009/0280748 A1 | 11/2009 | Shan et al. |
| 2009/0286545 A1 | 11/2009 | Yavuz et al. |
| 2009/0291690 A1 | 11/2009 | Guvenc et al. |
| 2009/0296640 A1 | 12/2009 | Gilbert |
| 2009/0298528 A1 | 12/2009 | Cave et al. |
| 2009/0305665 A1 | 12/2009 | Kennedy et al. |
| 2009/0311968 A1 | 12/2009 | Wigren |
| 2009/0313674 A1 | 12/2009 | Ludvig et al. |
| 2009/0316601 A1 | 12/2009 | Zhu et al. |
| 2009/0323641 A1 | 12/2009 | Futagi et al. |
| 2010/0009716 A1 | 1/2010 | Lee et al. |
| 2010/0027469 A1 | 2/2010 | Gurajala et al. |
| 2010/0061256 A1 | 3/2010 | Ang et al. |
| 2010/0062785 A1 | 3/2010 | Hwang |
| 2010/0067419 A1 | 3/2010 | Liu et al. |
| 2010/0081387 A1 | 4/2010 | Shi et al. |
| 2010/0081449 A1 | 4/2010 | Chaudhri et al. |
| 2010/0103924 A1 | 4/2010 | Rao et al. |
| 2010/0113080 A1* | 5/2010 | Ishii ............... H04L 5/0007 455/509 |
| 2010/0118842 A1 | 5/2010 | Kalhan |
| 2010/0144357 A1 | 6/2010 | Chaudhri et al. |
| 2010/0167742 A1 | 7/2010 | Rajagopalan et al. |
| 2010/0182928 A1 | 7/2010 | Wu et al. |
| 2010/0203917 A1 | 8/2010 | Yang et al. |
| 2010/0207786 A1 | 8/2010 | Chen et al. |
| 2010/0216404 A1 | 8/2010 | Hershey et al. |
| 2010/0222063 A1 | 9/2010 | Ishikura et al. |
| 2010/0223659 A1 | 9/2010 | Ekl et al. |
| 2010/0238895 A1* | 9/2010 | Nakatsugawa ....... H04W 16/14 370/329 |
| 2010/0250673 A1 | 9/2010 | Laroia et al. |
| 2010/0255855 A1 | 10/2010 | Sabat, Jr. et al. |
| 2010/0261423 A1 | 10/2010 | Stanforth et al. |
| 2010/0261467 A1 | 10/2010 | Chou et al. |
| 2010/0273432 A1* | 10/2010 | Meshkati ............. H04W 16/16 455/67.11 |
| 2010/0291938 A1 | 11/2010 | Jang |
| 2010/0309806 A1 | 12/2010 | Wu et al. |
| 2010/0311449 A1* | 12/2010 | Whinnett .......... H04W 72/0473 455/501 |
| 2010/0311452 A1 | 12/2010 | Li et al. |
| 2010/0317291 A1 | 12/2010 | Richardson |
| 2010/0330919 A1 | 12/2010 | Gurney et al. |
| 2011/0003605 A1 | 1/2011 | Song et al. |
| 2011/0009150 A1* | 1/2011 | Cairns ................ H04W 52/12 455/522 |
| 2011/0019625 A1* | 1/2011 | Zhang ................ H04W 52/365 370/329 |
| 2011/0021235 A1 | 1/2011 | Laroia et al. |
| 2011/0028170 A1 | 2/2011 | Sawai |
| 2011/0028179 A1 | 2/2011 | Sawai et al. |
| 2011/0028180 A1 | 2/2011 | Sawai |
| 2011/0033000 A1 | 2/2011 | Berens et al. |
| 2011/0034204 A1 | 2/2011 | Sawai et al. |
| 2011/0039495 A1 | 2/2011 | Sawai et al. |
| 2011/0039561 A1 | 2/2011 | Nuasimha et al. |
| 2011/0039569 A1 | 2/2011 | Narasimha et al. |
| 2011/0090885 A1 | 4/2011 | Safavi |
| 2011/0105184 A1 | 5/2011 | Piirainen et al. |
| 2011/0136448 A1 | 6/2011 | Yang et al. |
| 2011/0143805 A1 | 6/2011 | Ramasamy et al. |
| 2011/0151887 A1 | 6/2011 | Hakola et al. |
| 2011/0165903 A1 | 7/2011 | Selen |
| 2011/0177808 A1 | 7/2011 | Grokop et al. |
| 2011/0195667 A1 | 8/2011 | Hassan et al. |
| 2011/0195735 A1 | 8/2011 | Irmer et al. |
| 2011/0200136 A1 | 8/2011 | Song et al. |
| 2011/0249619 A1 | 10/2011 | Yu et al. |
| 2011/0261715 A1 | 10/2011 | Norefors et al. |
| 2011/0275379 A1 | 11/2011 | Hakola et al. |
| 2011/0300892 A1 | 12/2011 | Hakola et al. |
| 2012/0178482 A1 | 7/2012 | Seo et al. |
| 2012/0196611 A1 | 8/2012 | Venkatraman et al. |
| 2012/0309439 A1 | 12/2012 | Sawai |
| 2013/0100893 A1 | 4/2013 | Sawai |
| 2013/0102344 A1 | 4/2013 | Sawai |
| 2013/0102350 A1 | 4/2013 | Sawai et al. |
| 2013/0122947 A1 | 5/2013 | Li et al. |
| 2013/0142059 A1 | 6/2013 | Di Girolamo et al. |
| 2013/0150113 A1* | 6/2013 | Alamshahi ............ H04W 52/40 455/517 |
| 2013/0203435 A1 | 8/2013 | Smith et al. |
| 2013/0217429 A1 | 8/2013 | Kimura et al. |
| 2013/0242854 A1 | 9/2013 | Cai et al. |
| 2013/0316756 A1 | 11/2013 | Sawai et al. |
| 2014/0045542 A1 | 2/2014 | Sawai |
| 2014/0341150 A1* | 11/2014 | Kimura ................ H04W 24/02 370/329 |
| 2015/0119014 A1 | 4/2015 | Muraoka et al. |
| 2015/0146543 A1 | 5/2015 | Diener et al. |
| 2015/0223257 A1 | 8/2015 | Wilhelmsson et al. |
| 2015/0230243 A1 | 8/2015 | Sawai |
| 2015/0282184 A1 | 10/2015 | Yang et al. |
| 2015/0334664 A1 | 11/2015 | Sawai et al. |
| 2015/0351045 A1 | 12/2015 | Sawai |
| 2016/0066347 A1 | 3/2016 | Ji et al. |
| 2016/0073356 A1 | 3/2016 | Sawai et al. |
| 2016/0198414 A1* | 7/2016 | Yano ................... H04W 52/242 455/522 |
| 2016/0262025 A1 | 9/2016 | Zuniga et al. |
| 2016/0278157 A1 | 9/2016 | Sawai |
| 2016/0337983 A1 | 11/2016 | Sawai |
| 2016/0366653 A1 | 12/2016 | Sawai et al. |
| 2017/0086145 A1 | 3/2017 | Sawai |
| 2017/0188365 A1 | 6/2017 | Kimura et al. |
| 2017/0359785 A1 | 12/2017 | Sawai et al. |
| 2018/0007565 A1 | 1/2018 | Sawai et al. |
| 2018/0077853 A1 | 3/2018 | Dashiell et al. |
| 2018/0270890 A1 | 9/2018 | Sawai |
| 2018/0288714 A1 | 10/2018 | Sawai et al. |
| 2019/0014544 A1 | 1/2019 | Sawai |
| 2019/0281561 A1 | 9/2019 | Sawai et al. |
| 2019/0289659 A1 | 9/2019 | Sawai |

FOREIGN PATENT DOCUMENTS

| | | |
|---|---|---|
| JP | 2002-247639 A | 8/2002 |
| JP | 2007-235683 A | 9/2007 |
| JP | 2007-300419 A | 11/2007 |
| JP | 2009-160452 A | 5/2009 |
| JP | 2009-523379 A | 6/2009 |
| JP | 2011-520377 A | 7/2011 |
| JP | 2012-533924 A | 12/2012 |
| WO | WO 2008/076219 A2 | 6/2008 |
| WO | WO 2009/136760 A1 | 11/2009 |
| WO | WO 2010/027308 A1 | 3/2010 |

OTHER PUBLICATIONS

U.S. Appl. No. 16/670,826, filed Oct. 31, 2019, Sawai.
Japanese Office Action dated Oct. 1, 2019 in connection with Japanese Application No. 2018-134294, and English translation thereof.
Defnition "unit", "module", processor, American Heritage Dictionary (Year: 2016).
Definition "module", Microsoft Press Computer Dictionary, 3rd. Ed. (Year: 1997).
Definition "CPU", Microsoft Computer Dictionary, 5th ed. (Year: 2002).
U.S. Appl. No. 16/421,230, filed May 23, 2019, Sawai et al.
U.S. Appl. No. 16/428,806, filed May 31, 2019, Sawai.
Fujii et al., Spectrum sharing by adaptive transmit power control for low priority systems and its achievable capacity. Presented at the

(56) References Cited

OTHER PUBLICATIONS

3rd International Conference on Cognitive Oriented Wireless Networks and Communications, May 15-17, 2008 . IEICE Transactions on Communications v.E92-B (8); pp. 2568-2576. Aug. 1, 2009.

Fujii, Hiromasa et al., "Performance Analysis of Adaptive TPC Spectrum Sharing Under Multicell Environments", Crowncom, May 2008.

Gurney, David et al., "Geo-location Database Techniques for Incumbent Protection in the TV White Space", IEEE, Dyspan, 2008.

IEEE 802.22-2011 IEEE Standard for wireless regional area networks part 22: Cognitive wireless RAN medium access control (MAC) and physical layer (PHY) specifications: policies and procedures for operation in the TV bands. Jul. 1, 2011. 672 pages.

IEEE 802.22 Working Group on Wireless Regional Area Networks, WRAN WG Website: http://www.ieee802.org/22/. Apr. 16, 2010.

IEEE 802.22 Working Group on Wireless Regional Area Networks, WRAN WG Website: http://www.ieee802.org/22/HomePageText.htm, Apr. 27, 2015.

Inage et al., "Spectrum Sharing Based on Capacity Conservation Ratio of Primary User", IEICE Technical Report SR2009, May 2009. 8 pages.

Ramandeep, Ahuja et al., "Cognitive Radio System Using IEEE 802.11a over UHF TVWS", IEEE, Motorola, 2008.

Second Report and Order and Memorandum and Order, FCC08-260: http://hraunfoss.fcc.gov/edocs_public/attachmatch/FCC-08-260A1. Released on Nov. 14, 2008.

* cited by examiner

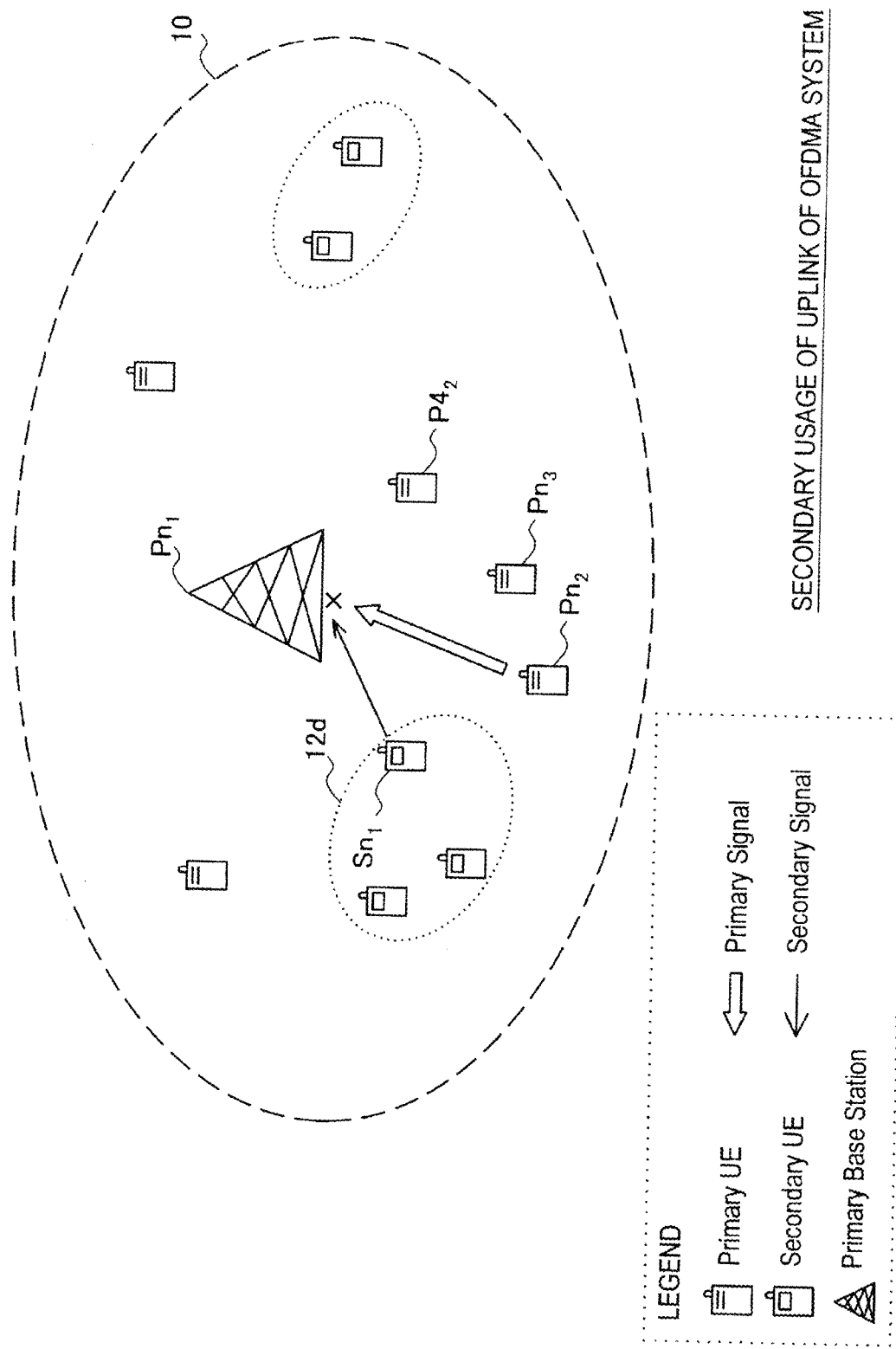

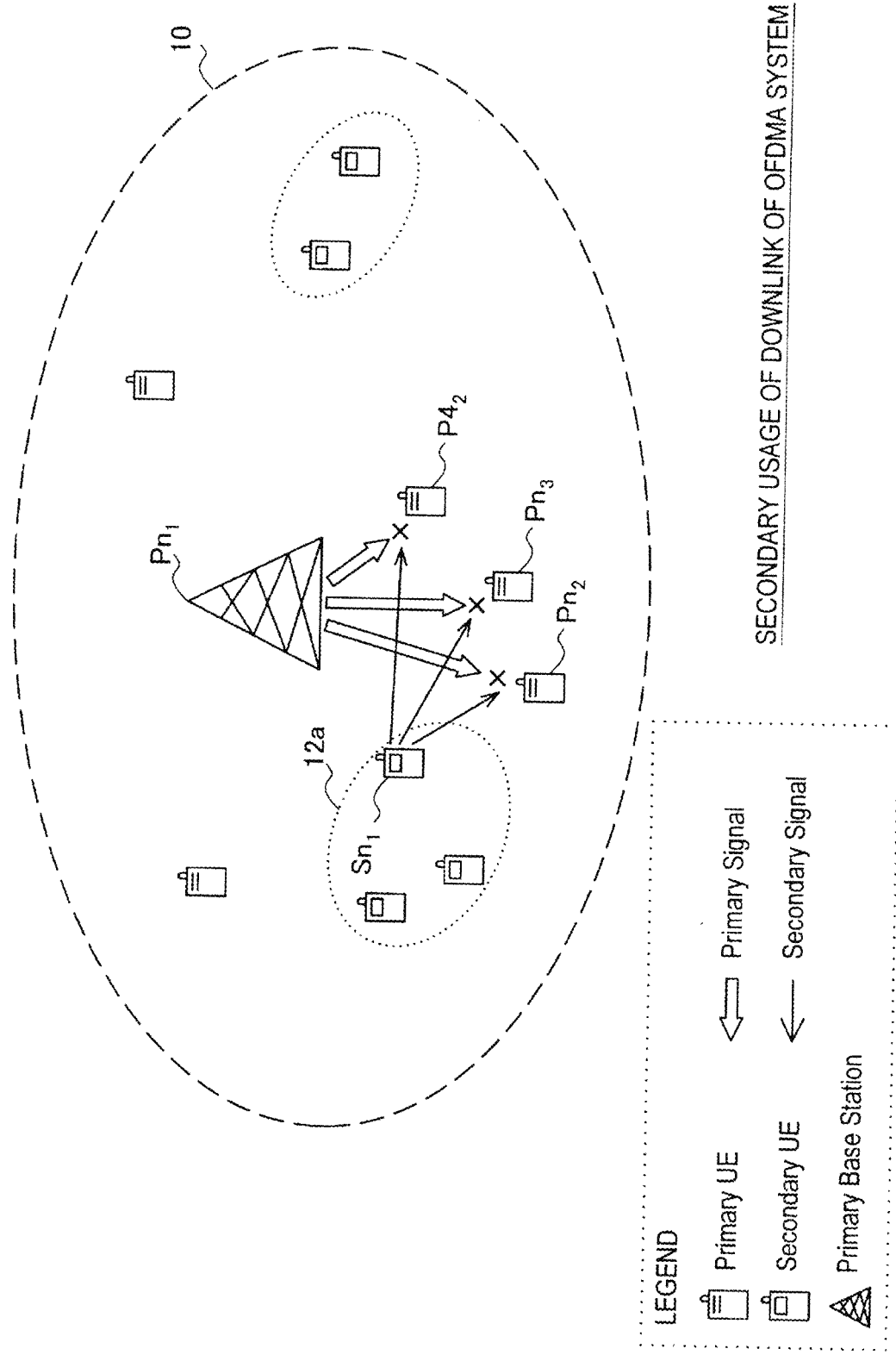

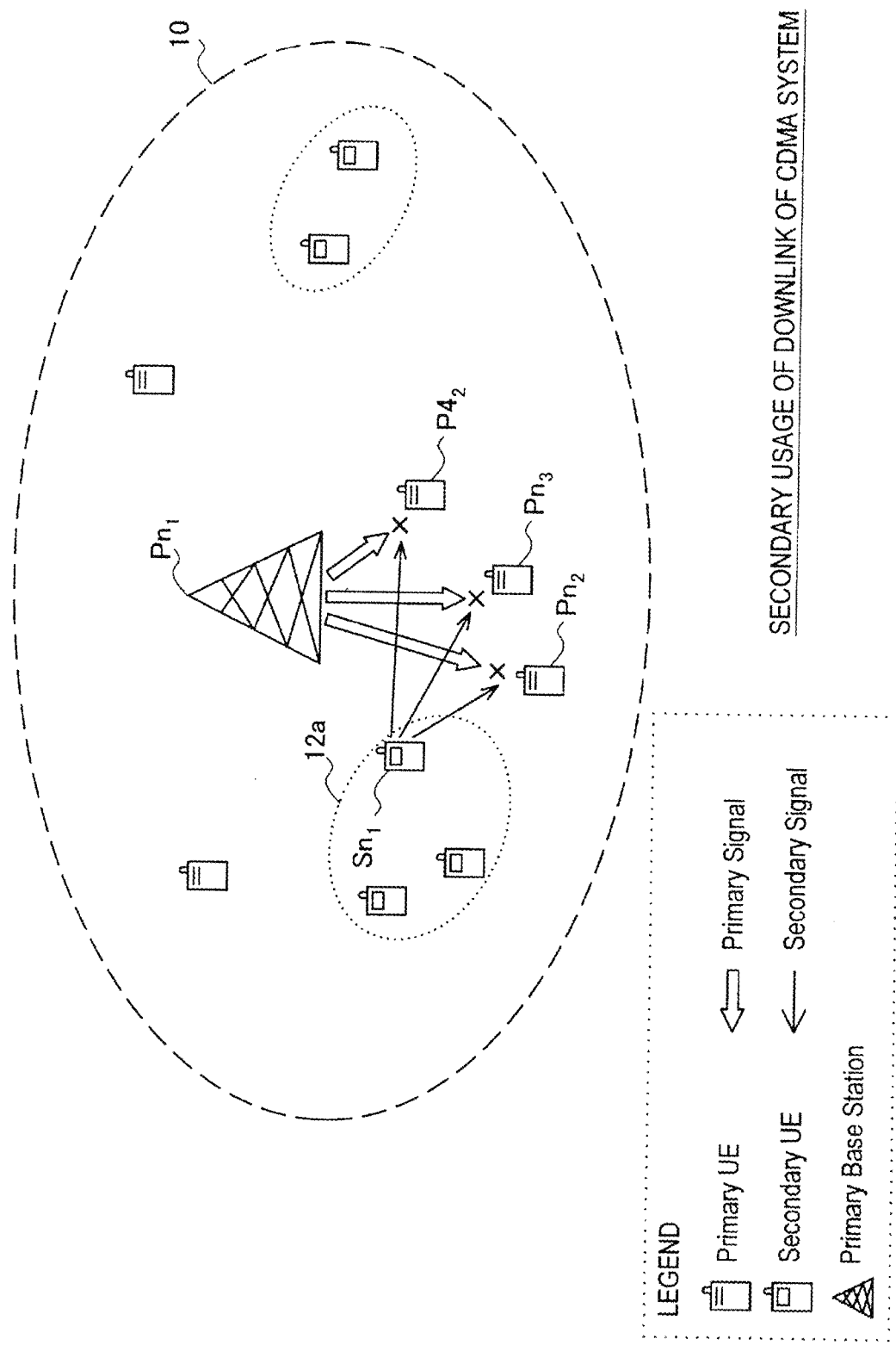

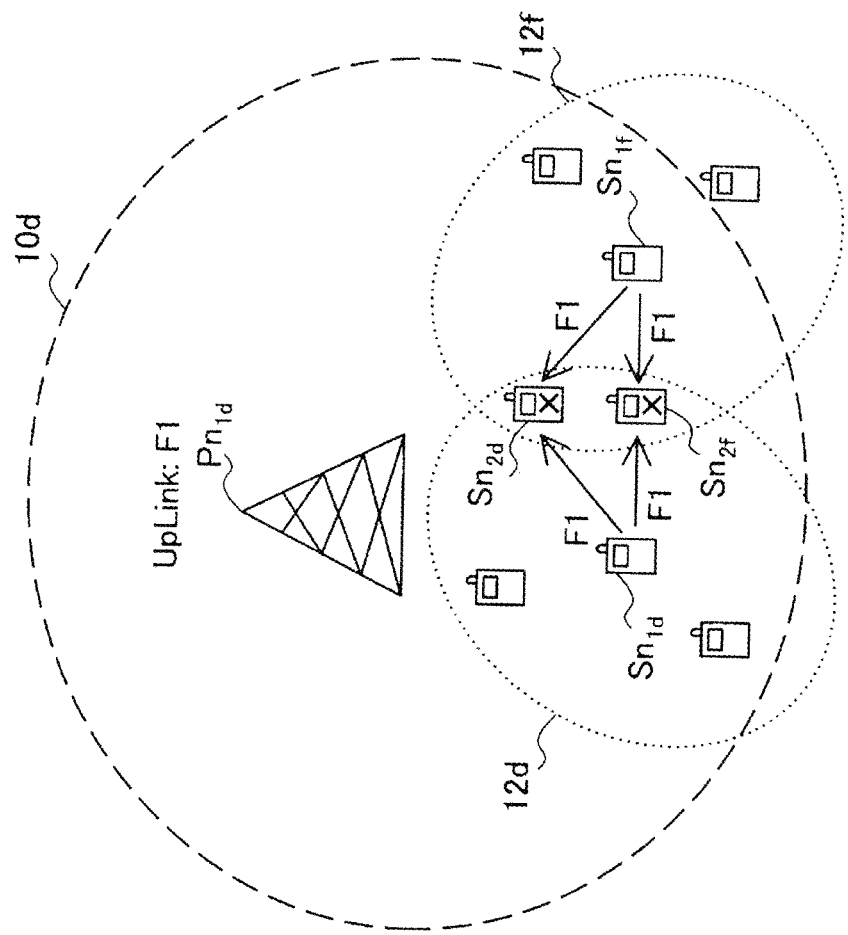

TRANSMISSION POWER DETERMINATION METHOD, COMMUNICATION DEVICE AND PROGRAM

CROSS REFERENCES TO RELATED APPLICATIONS

The present invention is a continuation of U.S. Ser. No. 15/703,247, entitled "TRANSMISSION POWER DETERMINATION METHOD, COMMUNICATION DEVICE AND PROGRAM," filed on Sep. 13, 2017, now U.S. Pat. No. 10,405,200, which is a continuation of U.S. Ser. No. 14/810,825, entitled "TRANSMISSION POWER DETERMINATION METHOD, COMMUNICATION DEVICE AND PROGRAM," filed on Jul. 28, 2015, now U.S. Pat. No. 9,820,168, which is a continuation of U.S. Ser. No. 13/655,002, entitled "TRANSMISSION POWER DETERMINATION METHOD, COMMUNICATION DEVICE AND PROGRAM", filed on Oct. 18, 2012, now U.S. Pat. No. 9,131,387, which is a continuation of U.S. Ser. No. 12/838,605 entitled "TRANSMISSION POWER DETERMINATION METHOD, COMMUNICATION DEVICE AND PROGRAM," filed Jul. 19, 2010, now U.S. Pat. No. 8,639,281, which contains subject matter related to Japanese Patent Application JP 2010-110012 filed in the Japan Patent Office on May 12, 2010, Japanese Patent Application JP2010-005230 filed in the Japan Patent Office on Jan. 13, 2010 and Japanese Patent Application JP2009-179367 filed in the Japan Patent Office on Jul. 31, 2009. The entire contents of each of the above referenced applications is incorporated herein by reference.

BACKGROUND OF THE INVENTION

Field of the Invention

The present invention relates to a transmission power determination method, a communication device and a program.

Description of the Related Art

Discussions have been taking place recently regarding secondary usage of a spectrum assigned for primary usage to provide a secondary communication service depending on the use condition of the spectrum. For example, the standard specification for allowing an unused channel contained in a spectrum of the U.S. digital TV broadcast (TV white spaces) to be available for radio communication has been studied in the IEEE802.22 working group (cf. "IEEE802.22 WG on WRANs", [online], [Searched on Jan. 5, 2009], Internet <URL:http://www.ieee802.org/22/>).

Further, according to the report from FCC (Federal Communications Commission) on November 2008, the discussions are directed toward permitting secondary usage of TV white spaces by using a communication device that fulfills a certain condition and has received an authorization. The FCC's report accepts the above-described standard specification of IEEE802.22 which is the pioneering work on the standardization of secondary usage of TV white spaces and further coverts the moves of a new study group in IEEE. Technically, because it is required to perform signal detection at the level of −114 [dBm] (SNR is about −19 [dB] when NF (Noise Figure) is 11 [dB], for example) with use of existing technology, for example, an auxiliary function such as geo-location database access is expected to be necessary (cf. "SECOND REPORT AND ORDER AND MEMORANDUM OPINION AND ORDER", [online], [Searched on Jul. 10, 2009], Internet <URL:http://hraunfoss.fcc.gov/edocs_public/attachmatch/FCC-08-260A1.pdf>). Further, the FCC is searching for opening a 250 MHz band, which is a part of a 5 GHz band, as a new channel for secondary usage.

Furthermore, in the EU, there are moves afoot to universally allocate a dedicated control channel called CPC (Cognitive Pilot Channel) for making DSA (Dynamic Spectrum Access) under a long-term strategy. Allocation of CPC is incorporated in the agenda of ITU (International Telecommunication Union)-WP11 in 2011. Technological studies for a secondary usage system that makes DSA are also being progressed in IEEE SCC (Standards Coordinating Committee) 41.

In such a background, several research reports have been released recently concerning secondary usage of a spectrum in the case of assuming a broadcasting system, a satellite communication system, a mobile communication system or the like as a primary system. For example, Alan Bok et al., "Cognitive Radio System using IEEE802.11a over UHF TVWS", Motorola, October 2008 proposes a system architecture in the case of operating a radio system with use of the IEEE802.22 standard on TV white spaces of UHF (Ultra High Frequency). Further, D. Gueny et al., "Geo-location database technique for incumbent protection in the TV White space", DySPAN, October 2008 also intends use of TV white spaces and proposes a form that utilizes positional information of a service area of a primary system as external information.

On the occasion of secondary usage of a spectrum, it is generally necessary for a system on the part of secondary usage (secondary system) to carry out the operation that does not degrade the communication quality of a primary system. Therefore, when transmitting a radio signal in the secondary system, it is desirable to control its transmission power so as to avoid interference on a node of the primary system.

Regarding such control of a transmission power, in the case of secondary usage of TV white spaces as proposed by Alan Bok et al. or D. Gueny et al., it can be confirmed beforehand that a channel for secondary usage is not used at all, and it is thus possible to determine in many cases that a transmission power at the maximum level can be used. On the other hand, H. Fujii and H. Yoshino (NTT docomo), "Spectrum sharing by adaptive transmit power control for low priority system and its achievable capacity", CrownCom, May 2008 proposes a technique that protects a node of a high-priority system by adaptively controlling a transmission power in a low-priority system.

Further, Inage et al., "Spectrum Sharing Based on Capacity Conservation Ratio of Primary User", IEICE Technical Report SR2009, May 2009 proposes a technique that, when a system such as a mobile communication system in which the receiving environment of a terminal varies depending on location due to fading or the like is the primary system, adopts the ratio of capacity (capacity conservation ratio) between before and after secondary usage in the primary system as a protection criterion and makes transmission power control for satisfying the capacity conservation ratio.

SUMMARY OF THE INVENTION

In order to make full effective use of a limited spectrum, it is not sufficient to achieve secondary usage of the above-described white space, which is a spectrum in an area where a communication service related to primary usage (which is referred to hereinafter as a first communication service) is not provided. One reason is that secondary usage of the white space is utilization of a spectrum that is apparently available in the long and medium terms in a particular region, and an actual opportunity of usage is limited to an area where there are only a small number of users of the first communication service. Further, as for secondary usage of the TV white space in the United States, for example, it is predicted that part of the spectrum is auctioned and a spectrum left for secondary usage is small.

Given such a situation, one possible approach is to make secondary usage of a spectrum within a service area of the first communication service under permission of a coordinator (e.g. a base station) of the first communication service, for example. Another possible approach is to make secondary usage of a spectrum that is unavailable for the first communication service in an area inside or in the peripheral part of a service area of the first communication service where signal receiving conditions are relatively unsuitable due to shadowing (shielding), fading or the like. In such cases of secondary usage, it is expected that a node of the primary system (which is referred to hereinafter as a primary usage node) and a node of the secondary system (which is referred to hereinafter as a secondary usage node) are located closer to each other. Therefore, a mechanism of transmission power control that suppresses interference with enhanced adaptability is desirable. For example, because the technique taught by Inage et al. decreases the entire capacity of the primary system in one cell at a constant rate and allocates the amount of decrease to the secondary system, there remains a possibility it becomes difficult to receive a radio signal (primary signal) locally in one primary usage node due to interference of the secondary usage node in the nearby vicinity.

In light of the foregoing, it is desirable to provide a novel and improved transmission power determination method, communication device and program that can improve the adaptability of transmission power control on the occasion of secondary usage of a spectrum and suppress interference on the primary system.

According to an embodiment of the present invention, there is provided a method for determining an acceptable transmission power for a second communication service making secondary usage of a spectrum assigned to a first communication service, including the step of determining the acceptable transmission power based on quality of a radio signal required in the first communication service, an interference level or a noise level in the first communication service, and a path loss on a communication path about one or more secondary usage node that transmits a radio signal of the second communication service.

In this configuration, an acceptable transmission power for a second communication service making secondary usage of a spectrum is determined adaptively based on quality of a radio signal required in the first communication service, an interference level or a noise level in the first communication service, and a path loss on a communication path about one or more secondary usage node that transmits a radio signal of the second communication service.

The quality of a radio signal required in the first communication service may be represented by using a reception level of a radio signal required in the first communication service and a signal to interference and noise ratio.

The method may further include the steps of: acquiring location data from a database that stores the location data indicating a location of a primary usage node that receives a radio signal of the first communication service; and calculating the path loss on the communication path about the one or more secondary usage node based on the location of the primary usage node indicated by the location data and a location of the one or more secondary usage node.

The method may be executed by a primary usage node that has access to the database, and may further include the step of notifying the determined acceptable transmission power from the primary usage node to any node among the one or more secondary usage node.

The method may be executed by a node acting as a coordinator of the second communication service among the one or more secondary usage node.

The method may be executed by a node acting as a coordinator of the second communication service among the one or more secondary usage node, and when the node acting as the coordinator is not able to acquire location data indicating a location of a primary usage node that receives a radio signal of the first communication service in the step of determining the acceptable transmission power, the acceptable transmission power may be determined by counting in a margin for reducing a possibility of causing interference on the primary usage node.

The margin may have a value depending on an expected number of the secondary usage node.

According to another embodiment of the present invention, there is provided a communication device including: a communication unit that is able to transmit a radio signal of a second communication service making secondary usage of a spectrum assigned to a first communication service; and a control unit that determines an acceptable transmission power for the second communication service, wherein the control unit determines the acceptable transmission power based on quality of a radio signal required in the first communication service, an interference level or a noise level in the first communication service, and a path loss on a communication path about one or more secondary usage node that transmits a radio signal of the second communication service.

According to another embodiment of the present invention, there is provided a program causing a computer as a control unit, the computer controlling a communication device including a communication unit that is able to transmit a radio signal of a second communication service making secondary usage of a spectrum assigned to a first communication service, wherein: the control unit determines an acceptable transmission power for the second communication service based on quality of a radio signal required in the first communication service, an interference level or a noise level in the first communication service, and a path loss on a communication path about one or more secondary usage node that transmits a radio signal of the second communication service.

According to another embodiment of the present invention, there is provided a communication device including: a communication unit that is able to communicate with a secondary usage node that transmits a radio signal of a second communication service making secondary usage of a spectrum assigned to a first communication service; and a control unit that determines an acceptable transmission power for the second communication service, wherein the control unit determines the acceptable transmission power based on quality of a radio signal required in the first communication service, an interference level or a noise level in the first communication service, and a path loss on a communication path about one or more secondary usage node.

According to another embodiment of the present invention, there is provided a program causing a computer as a control unit, the computer controlling a communication device including a communication unit that is able to communicate with a secondary usage node that transmits a radio signal of a second communication service making secondary usage of a spectrum assigned to a first communication service, wherein: the control unit determines an acceptable transmission power for the second communication service based on quality of a radio signal required in the first communication service, an interference level or a noise level in the first communication service, and a path loss on a communication path about one or more secondary usage node.

According to the embodiments of the present invention described above, it is possible to provide a transmission power determination method, a communication device and a program that can improve the adaptability of transmission power control on the occasion of secondary usage of a spectrum and suppress interference on the primary system.

BRIEF DESCRIPTION OF THE DRAWINGS

FIG. 2A is a first diagram to describe the effect of interference depending on a communication scheme and a channel direction.

FIG. 2B is a second diagram to describe the effect of interference depending on a communication scheme and a channel direction.

FIG. 2D is a fourth diagram to describe the effect of interference depending on a communication scheme and a channel direction.

FIG. 3B is a second diagram to describe interference between second communication services.

DETAILED DESCRIPTION OF THE EMBODIMENT(S)

Figure 1A:
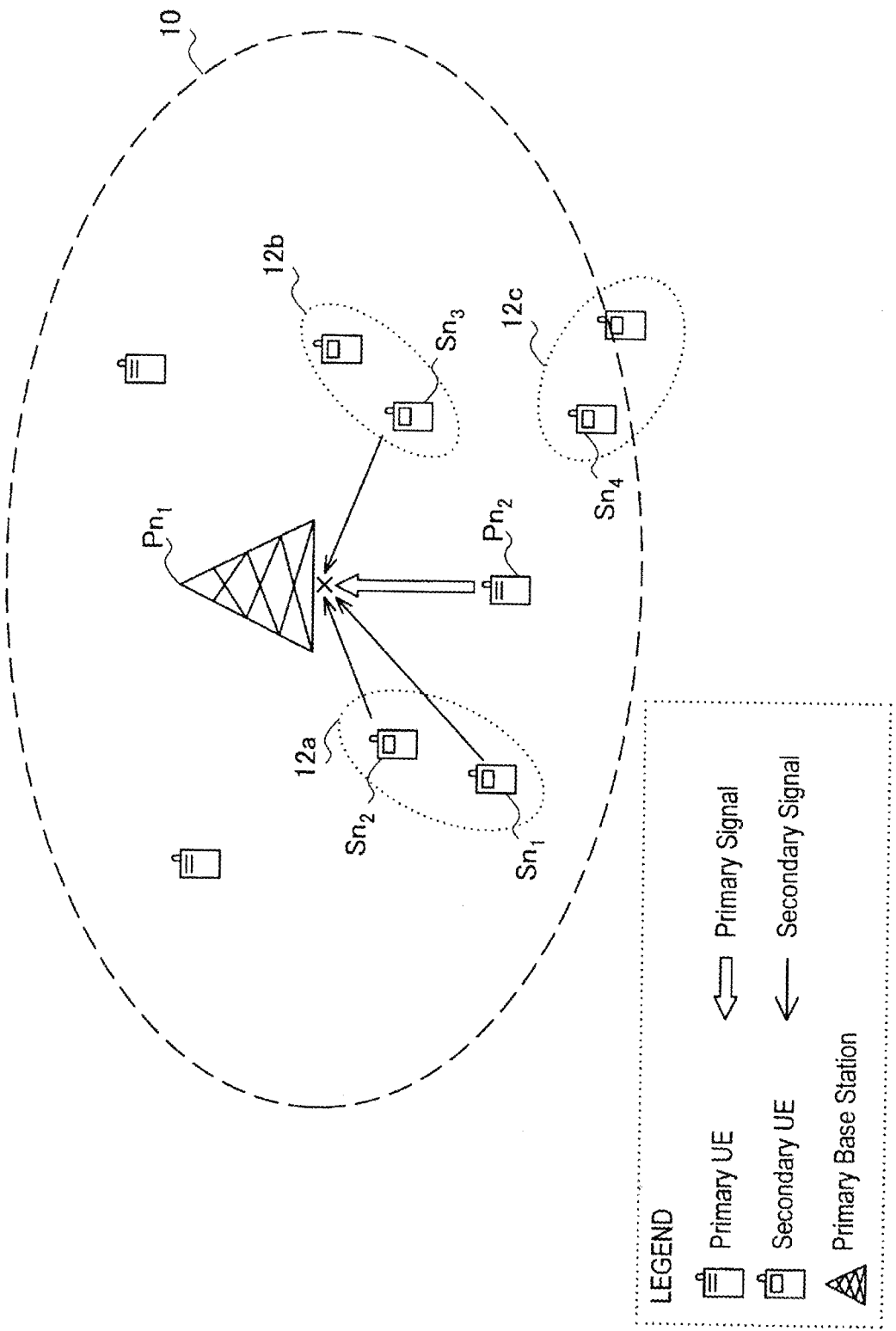
FIG. 1A is a diagram showing a first example in which a primary usage node receives interference by secondary usage of a spectrum.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Interference Control Model according to First Embodiment
   1-1. Example of Interference by Secondary Usage of Spectrum
   1-2. Description of Interference Control Model
   1-3. Comparison of Channels for Secondary Usage
   1-4. Study on Interference between Second Communication Services
   1-5. Distribution of Transmission Powers among Second Communication Services
   1-6. Scope of Term "Secondary Usage"
2. First Embodiment
   2-1. Overview of Communication System
   2-2. Exemplary Configuration of Management Node
   2-3. Exemplary Configuration of Terminal Device
   2-4. Summary of First Embodiment
   2-5. Alternative Example
3. Second Embodiment
   3-1. Overview of Communication System
   3-2. Exemplary Configuration of Management Node
   3-3. Exemplary Configuration of Terminal Device
   3-4. Summary of Second Embodiment
4. Application to TV Band

1. Interference Control Model According to First Embodiment

[1-1. Example of Interference by Secondary Usage of Spectrum]

Figure 1B:
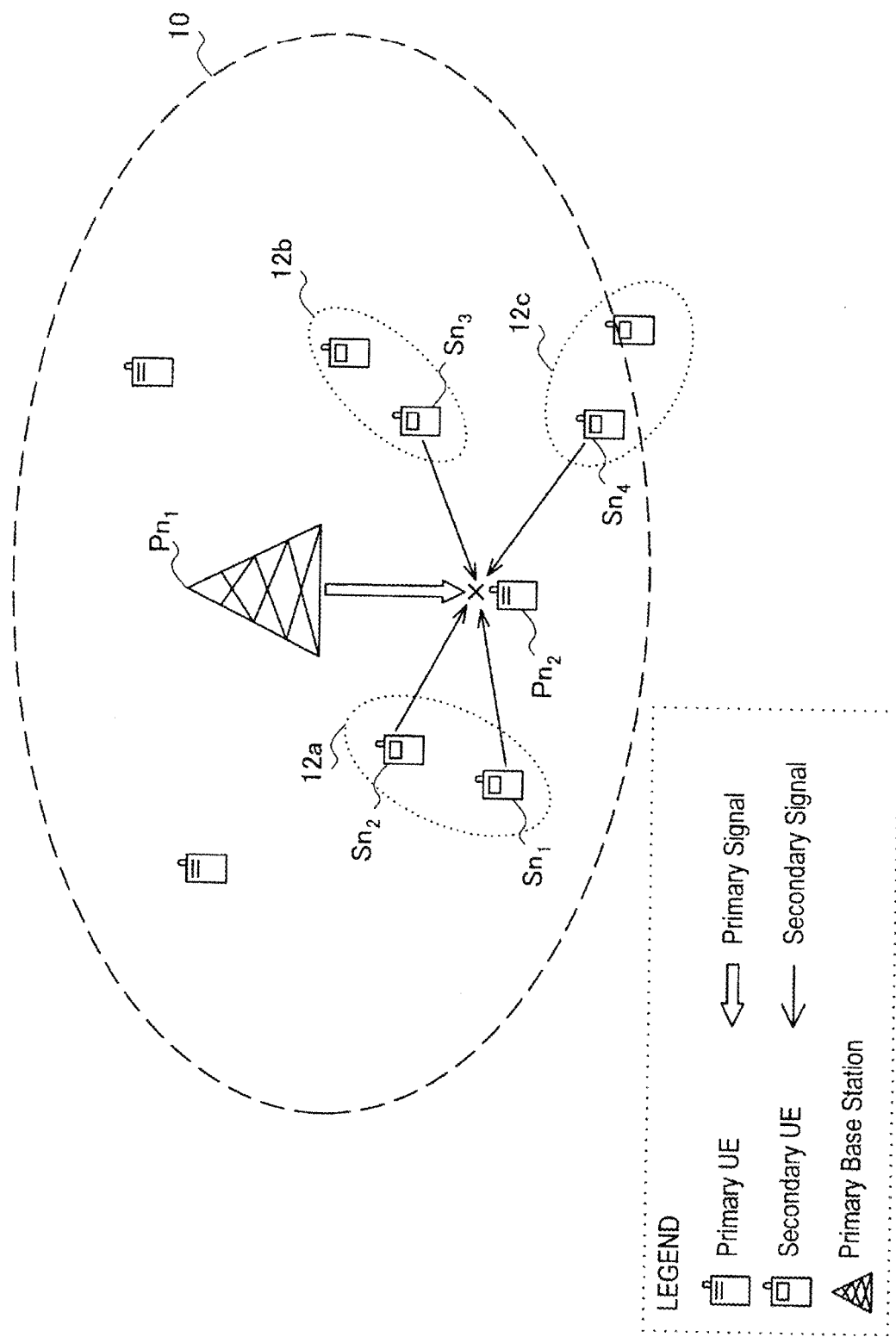
FIG. 1B is a diagram showing a second example in which a primary usage node receives interference by secondary usage of a spectrum.

Firstly, a case where a primary usage node receives interference due to secondary usage of a spectrum is described briefly with reference to FIGS. 1A and 1B. FIGS. 1A and 1B are diagrams respectively showing an example in which any primary usage node included in a primary system receives interference by secondary usage of a spectrum.

Referring to FIG. 1A, primary usage nodes $Pn_1$ and $Pn_2$ are located inside a cell 10 of a first communication service. The primary usage node $Pn_1$ is a base station (PBS: Primary Base Station) that provides the first communication service to a terminal device (which is also called UE: User Equipment) located inside the cell 10. The first communication service may be a given communication service including a digital TV broadcasting service, a satellite communication service, a mobile communication service or the like. On the other hand, the primary usage node $Pn_2$ is a terminal device (PUE: Primary User Equipment) that is provided with the first communication service. The primary usage node $Pn_1$, the primary usage node $Pn_2$, and the other primary usage nodes in the FIG. 1A transit and receive radio signals by using a spectrum assigned to the first communication service and thereby establishes a primary system.

FIG. 1A also shows a plurality of secondary usage nodes $Sn_1$, $Sn_2$, $Sn_3$ and $Sn_4$ located inside the cell 10. Those secondary usage nodes operate a second communication service by using a part or whole of the spectrum assigned to the first communication service (i.e. by making secondary usage of the spectrum) in accordance with a predetermined spectrum policy and thereby establishes a secondary system. The second communication service may be a radio communication service that is implemented in conformity with an arbitrary radio communication protocol such as IEEE802.11a/b/g/n/s, Zigbee or WiMedia, for example. A plurality of secondary systems may be established in a single cell, and, in the example of FIG. 1A, different secondary systems are established in an area 12a, an area 12b and an area 12c inside the cell 10. Note that, although the primary usage node and the secondary usage node are described separately for the sake of clarity of explanation, a part of the primary usage node may operate as the secondary usage node.

When the second communication service is operated inside the cell 10 of the first communication service as shown in FIG. 1A, there is a possibility that radio signals transmitted for the second communication service interfere with the first communication service. The example of FIG. 1A shows the possibility that radio signals transmitted from the secondary usage nodes $Sn_1$, $Sn_2$ and $Sn_3$ interfere with an uplink signal transmitted from the primary usage node $Pn_2$ to the primary usage node $Pn_1$. In this case, there is a possibility that the primary usage node $Pn_1$ fails to normally receive the uplink signal, or, even if it receives it, fails to obtain the desired service quality.

In FIG. 1B, just like FIG. 1A, the primary usage nodes $Pn_1$ and $Pn_2$ are located inside the cell 10 of the first communication service, and the primary usage node $Pn_1$ serving as a base station provides the first communication service to the primary usage node $Pn_2$ serving as a terminal device. Further, the secondary usage nodes $Sn_1$, $Sn_2$, $Sn_3$ and $Sn_4$ are shown inside the cell 10 of the first communication service. The example of FIG. 1B shows the possibility that radio signals transmitted from the secondary usage nodes $Sn_1$, $Sn_2$, $Sn_3$ and $Sn_4$ interfere with a downlink signal transmitted from the primary usage node $Pn_1$ to the primary usage node $Pn_2$. In this case, there is a possibility that the primary usage node $Pn_2$ fails to normally receive the downlink signal, or, even if it receives it, fails to obtain the desired service quality.

One solution to prevent such interference by secondary usage of a spectrum and avoid an adverse effect such as degradation of communication quality on the first communication service is to reduce a transmission power that is used for transmission of radio signals from the secondary usage nodes. On the other hand, reduction of a transmission power leads to a decrease in the capacity of the second communication service and degradation of communication quality. Therefore, it is effective to increase a transmission power for the second communication service as much as possible within the range that does not cause interference on the first communication service. Thus, a relationship between interference on the first communication service due to secondary usage of a spectrum and a transmission power used in the secondary usage nodes is described hereinbelow.

[1-2. Description of Interference Control Model]

Focusing attention on one-to-one relationship between the secondary usage node on the part of giving interference due to secondary usage and the primary usage node on the part of receiving interference (which is referred to hereinafter as an interfered node), it is necessary to satisfy the following relational expression (1) in order for the interference to be accepted in the interfered node. Note that the interfered node can correspond to the primary usage node $Pn_1$ in FIG. 1A or the primary usage node $Pn_2$ in FIG. 1B, for example.

$$SINR_{required} \leq \frac{P_{rx\_primary,primary}}{P_{rx\_primary,secondary} + N_{primary}} \quad \text{Expression (1)}$$

In the above expression, $SINR_{required}$ indicates the minimum SINR (Signal to Interference and Noise Ratio) that is required in the interfered node. $SINR_{required}$ may be the minimum receiving sensitivity of the interfered node, the minimum SINR given according to QoS (Quality of Service) or the like, for example. Further, $P_{rx\_primary,primary}$ indicates the reception level of a radio signal that is required in the first communication service, and $P_{rx\_primary,secondary}$ indicates the reception level of a radio signal that is transmitted from the secondary usage node in the interfered node. Further, $N_{primary}$ indicates the interference or noise level (including one or both of the interference level and the noise level) that can be applied to the interfered node.

Further, the reception level of a radio signal is represented by the transmission power of a radio signal and the path loss as shown in the following relational expressions (2) and (3).

$$P_{rx\_primary,secondary} = P_{tx\_secondary}/L_{path\_tx\_secondary} \quad \text{Expression (2)}$$

$$P_{rx\_primary,primary} = P_{tx\_primary}/L_{path\_tx\_primary} \quad \text{Expression (3)}$$

In the above expression, $P_{tx\_secondary}$ indicates the transmission power of a radio signal in the secondary usage node, and $L_{path\_tx\_secondary}$ indicates the path loss on the communication path from the secondary usage node to the interfered node. Further, $P_{tx\_primary}$ indicates the transmission power of a radio signal in the first communication service, and $L_{path\_tx\_primary}$ indicates the path loss on the communication path of a radio signal in the first communication service. Thus, the above relational expression (1) is deformed into the following expression.

$$SINR_{required} \leq \frac{P_{rx\_primary,primary}}{P_{tx\_secondary}/L_{path\_tx\_secondary} + N_{primary}} \quad \text{Expression (4)}$$

Note that the interference or noise level $N_{primary}$ included in the expression (1) and the expression (4) can be calculated by the following expression, for example, with use of the Boltzmann constant $k=1.38\times10^{-23}$[J/K], the absolute temperature T[K], the noise figure NF and the bandwidth BW[Hz].

$$N_{primary} = I_{primary} + 10^{10\ log_{10}(kT)+NF+10\ log_{10}(BW)} \quad \text{Expression (5)}$$

In the above expression, $I_{primary}$ may include inter-cell interference in the first communication service, intra-cell interference in a heterogeneous environment where a femtocell, a small cell or a relay node is overlaid by a macrocell, interference by out-of-band radiation or the like. Further, the path loss on the communication path of a radio signal typically depends on the distance d between two nodes, and it can be calculated by the following expression, for example.

$$L_{path}(d) = 10^{\frac{-10-\log_{10}\left(\frac{\lambda}{4\pi d_0}\right)^2 + 10n\log_{10}\left(\frac{d}{d_0}\right)}{10}} \quad \text{Expression (6)}$$

In the above expression, $d_0$ indicates the reference distance, $\lambda$ indicates the wavelength of a carrier frequency, and n indicates the propagation constant.

The relational expression (4) is further deformed into the following expression.

$$P_{tx\_secondary} \leq \quad \text{Expression (7)}$$
$$\left(\frac{P_{rx\_primary,primary}}{SINR_{required}} - N_{primary}\right) \cdot L_{path\_tx\_secondary}$$

If the transmission power of the secondary usage node is controlled so as to satisfy the relational expression (7), the interference can be accepted in the interfered node at least concerning the one-to-one relationship between the secondary usage node and the interfered node. Further, when a plurality of secondary usage nodes exist, it is needed to satisfy the following relational expression if the total number of secondary usage nodes acting as the source of interference is n.

$$\sum_{i=1}^{n}\left(P_{tx\_secondary,i}/L_{path\_tx\_secondary,i}\right) \leq \quad \text{Expression (8)}$$
$$\frac{P_{rx\_primary,primary}}{SINR_{required}} - N_{primary}$$

Consequently, on the assumption that the largest possible capacity or the highest possible communication quality is obtained in the second communication service as well, the interference power level $I_{acceptable}$ which is acceptable for the second communication service as a whole is given by the following expression.

$$\sum_{i=1}^{n}\left(P_{tx\_secondary,i}/L_{path\_tx\_secondary,i}\right) = \quad \text{Expression (9)}$$
$$\frac{P_{rx\_primary,primary}}{SINR_{required}} - N_{primary}(=I_{acceptable})$$

Herein, since the parameters in the right-hand member of the expression (9) and the value of the path loss $L_{path\_tx\_secondary,i}$ are known, only the transmission power $P_{tx\_secondary,i}$ depending on the interference power level $I_{acceptable}$ becomes a parameter to be determined. It may be understood that the expression (9) is an estimation formula to estimate the total sum of acceptable interference powers on the primary system due to secondary systems.

Specifically, as for a certain secondary usage node that makes secondary usage of the spectrum assigned to the first communication service, it is desirable to control transmission powers of secondary usage nodes in such a way that the transmission powers satisfy the expression (9) as a whole.

[1-3. Comparison of Channels for Secondary Usage]

FIGS. 2A to 2D are diagrams to describe the effect of interference on the occasion of secondary usage, depending on a communication scheme and a channel direction used in the first communication service.

FIGS. 2A to 2D show a primary usage node $Pn_1$ serving as a base station and three primary usage nodes $Pn_2$, $Pn_3$ and $Pn_4$ serving as PUEs. The primary usage nodes $Pn_1$, $Pn_2$, $Pn_3$ and $Pn_4$ establish a primary system by using OFDMA (Orthogonal Frequency Division Multiple Access) in the examples of FIGS. 2A and 2B. The primary system in this case may be WiMAX (registered trademark) system, LTE (Long Term Evolution) system, LTE-A (LTE-Advanced) system or the like, for example. Further, the primary usage nodes $Pn_1$, $Pn_2$, $Pn_3$ and $Pn_4$ establish a primary system by using CDMA (Code Division Multiple Access) in the examples of FIGS. 2C and 2D. The primary system in this case may be a UMTS (Universal Mobile Telecommunications System), W-CDMA (Wideband-CDMA) or the like, for example.

FIGS. 2A to 2D also show a secondary usage node $Sn_1$. The secondary usage node $Sn_1$ transmits and receives a radio signal (secondary signal) for the second communication service to and from another secondary usage node located in an area 12a, which can cause interference on the primary usage nodes $Pn_1$, $Pn_2$, $Pn_3$ and $Pn_4$. The influential range of the interference depends on a communication scheme and a channel direction of the first communication service which is the target of secondary usage.

Referring first to FIG. 2A, when secondary usage is made on an uplink channel of the OFDMA system, interference can occur only on an uplink signal from any one PUE to the base station in the primary system. In the example of FIG. 2A, the secondary signal from the secondary usage node $Sn_1$ interferes with the uplink signal from the primary usage node $Pn_2$ to the primary usage node (base station) $Pn_1$. In this case, the uplink signals from the other PUEs are not affected by the secondary signal because they are allocated in advance to different resource blocks (or different frequency slots or time slots).

Referring next to FIG. 2B, when secondary usage is made on a downlink channel of the OFDMA system, interference can occur on downlink signals from the base station to the respective PUEs in the primary system. In the example of FIG. 2B, the secondary signal from the secondary usage node $Sn_1$ interferes with the downlink signals from the primary usage node (base station) $Pn_1$ to the primary usage nodes $Pn_2$, $Pn_3$ and $Pn_4$. This is because the downlink signals (e.g. signals of a control channel) can be transmitted by using a common resource block or the like to the plurality of PUEs.

Figure 2C:
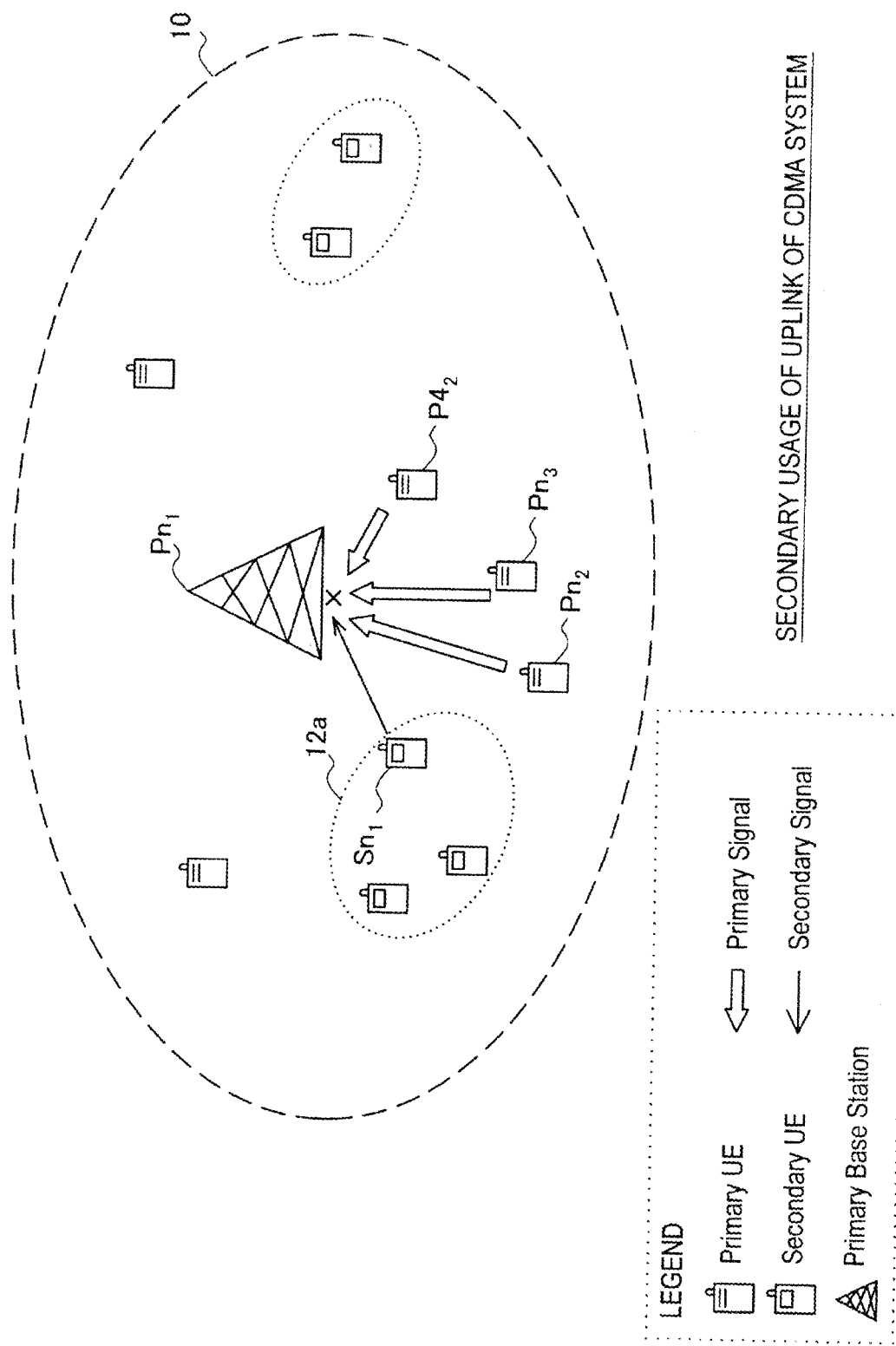
FIG. 2C is a third diagram to describe the effect of interference depending on a communication scheme and a channel direction.

Referring then to FIG. 2C, when secondary usage is made on an uplink channel of the CDMA system, interference can occur on uplink signals from the respective PUEs to the base station in the primary system. In the example of FIG. 2C, the secondary signal from the secondary usage node $Sn_1$ interferes with the uplink signals from the primary usage nodes $Pn_2$, $Pn_3$ and $Pn_4$ to the primary usage node (base station) $Pn_1$. Because the primary signals are typically spread to the entire band by using spread codes assigned to the respective PUEs and transmitted simultaneously in the CDMA system, the secondary signal can interfere with the primary signals from the plurality of PUEs.

Referring further to FIG. 2D, when secondary usage is made on a downlink channel of the CDMA system, interference can occur on downlink signals from the base station to the respective PUEs in the primary system. In the example of FIG. 2D, the secondary signal from the secondary usage node $Sn_1$ interferes with the downlink signals from the primary usage node (base station) $Pn_1$ to the primary usage nodes $Pn_2$, $Pn_3$ and $Pn_4$. This is because the downlink signals (e.g. signals of a control channel) can be received in common by the plurality of PUEs and because the primary signals are spread to the entire band and transmitted simultaneously as in the uplink channel of the CDMA system.

The influential range of interference and the technical requirements in the case of using the above-described four types of channels for secondary usage are summarized in the following table 1.

TABLE 1

Table 1. Influential range of interference and technical requirements

| Communication scheme | Channel direction | | | |
|---|---|---|---|---|
| | Uplink | | Downlink | |
| OFDMA | Interfered node | BS | Interfered node | UEs |
| | Interfered link | a UE -> BS | Interfered link | BS -> UEs |
| | Functional requirement | UL synchronization | Functional requirement | DL synchronization (Control channel identification) |
| | Minimum receiving sensitivity | −90 dBm | Minimum receiving sensitivity | −90 dBm |
| CDMA | Interfered node | BS | Interfered node | UE |
| | Interfered link | UEs -> BS | Interfered link | BS -> UEs |
| | Functional requirement | Code detection | Functional requirement | Code detection |
| | Minimum receiving sensitivity | −120 dBm | Minimum receiving sensitivity | −120 dBm |

Referring to the table 1, the influential range of interference is the smallest in the uplink channel of the OFDMA system as described above. Specifically, interfere can occur only on the link from one UE ("a UE") to the base station when making secondary usage of an uplink channel of the OFDMA system, whereas interfere can occur on the links related to a plurality of UEs when making secondary usage of another channel. In terms of functional requirements, detection of the spread code is necessary for sensing of the primary signal in the CDMA system, whereas only UL (uplink) or DL (downlink) synchronization is necessary in the OFDMA system, so that the CDMA system can be implemented more readily. Further, the minimum receiving sensitivity is −120 dBm (in the case of UMTS) in the CDMA system, whereas it is −90 dBm (in the case of WiMAX) in the OFDMA system, for example, and it is less subject to interference in the OFDMA system. Thus, on the occasion of secondary usage of a spectrum, it is desired to make secondary usage of the spectrum of the uplink channel, particularly, in the spectrum of the first communication service that employs the OFDMA scheme. In light of this, an embodiment which is described later in this specification is based on the assumption that secondary usage is made on the uplink channel of the OFDMA system. Note, however, that the present invention is applicable to the downlink channel of the OFDMA system or channels using a communication system other than the OFDMA system.

[1-4. Study on Interference Between Second Communication Services]

Interference which secondary usage of a spectrum causes on the first communication service is described above. Hereinafter, interference between second communication services in the case where there are a plurality of second communication services that make secondary usage of the spectrum assigned to the first communication service is described.

Figure 3A:
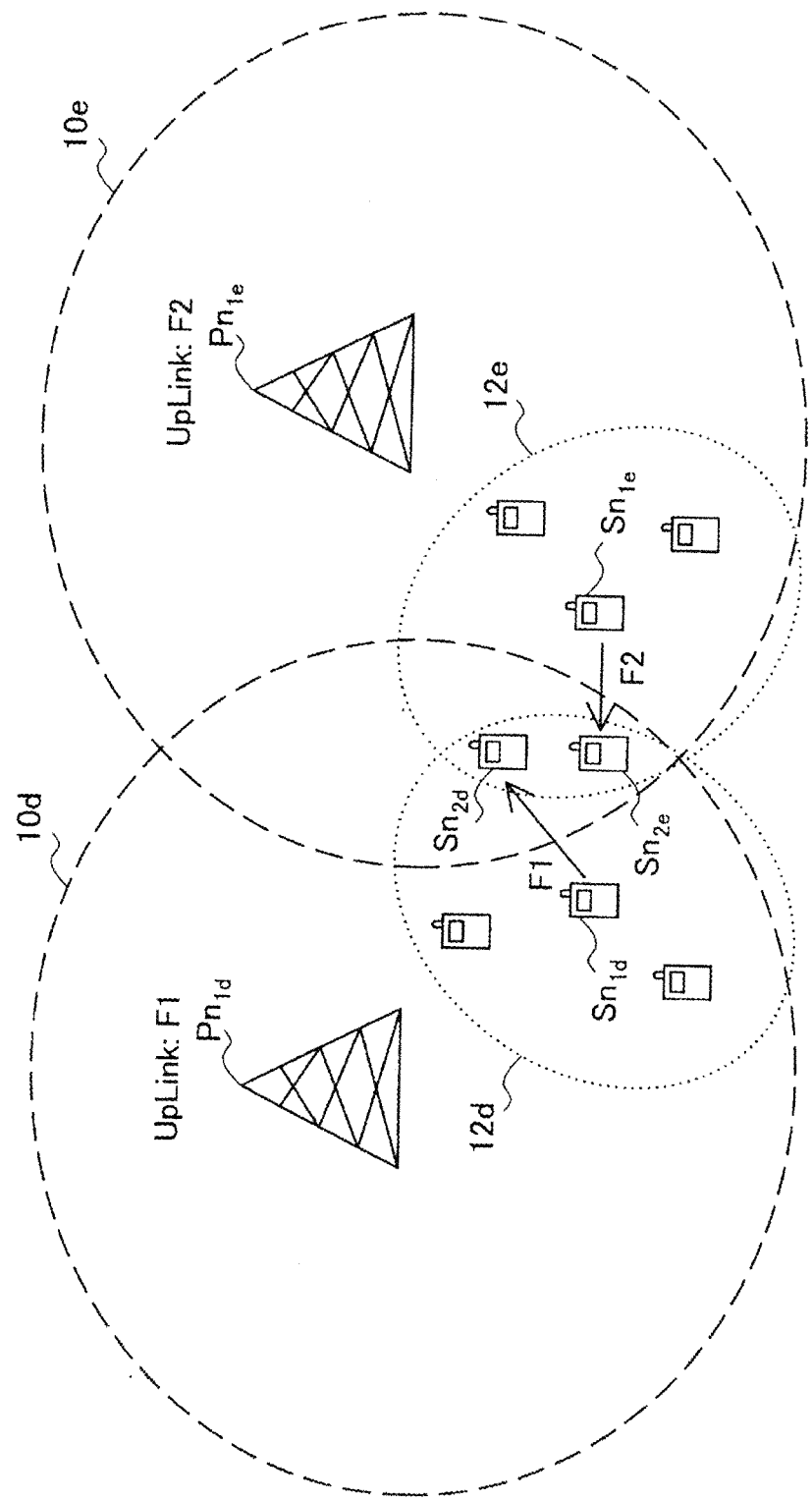
FIG. 3A is a first diagram to describe interference between second communication services.

FIGS. 3A and 3B are diagrams to describe interference between second communication services. FIG. 3A shows an example in which second communication services are respectively operated in different adjacent cells. On the other hand, FIG. 3B shows an example in which two second communication services are operated in the same cell.

FIG. 3A shows a primary usage node $Pn_{1d}$ which is a base station located inside a cell 10$d$ and a primary usage node $Pn_{1e}$ which is a base station located inside a cell 10$e$. Further, secondary usage nodes $Sn_{1d}$ and $Sn_{2d}$ and $Sn_{2d}$ and a secondary usage node $Sn_{2e}$ are included inside the cell 10$d$. Secondary usage nodes $Sn_{1e}$ and $Sn_{2e}$ and a secondary usage node $Sn_{2d}$ are included inside the cell 10$e$. The secondary usage nodes $Sn_{1d}$ and $Sn_{2d}$ operate the second communication service inside an area 12$d$. Further, the secondary usage nodes $Sn_{1e}$ and $Sn_{2e}$ operate the second communication service inside an area 12$e$.

When the first communication service employs the OFDMA scheme, for example, different frequencies are typically assigned as channel frequencies used between adjacent cells by interference avoidance algorithm between the adjacent cells. In the example of FIG. 3A, an uplink channel frequency of the cell 10$d$ is F1, and an uplink channel frequency of the cell 10$e$ is F2. Therefore, when the uplink channel of the OFDMA scheme is the target of secondary usage, the frequency used for communication between the secondary usage nodes $Sn_{1d}$ and $Sn_{2d}$ is F1, and the frequency used for communication between the secondary usage nodes $Sn_{1e}$ and $Sn_{2e}$ is F2. As a result, although the area 12$d$ and the area 12$e$ overlap with each other in the example of FIG. 3A, the secondary signals transmitted and received by the secondary usage nodes $Sn_{2d}$ and $Sn_{2e}$ that are located in the overlapping part do not interfere (or collide) with each other.

On the other hand, FIG. 3B shows a primary usage node $Pn_{1d}$ which is a base station located inside a cell 10$d$. Further, secondary usage nodes $Sn_{1d}$ and $Sn_{2d}$ and secondary usage nodes $Sn_{1f}$ and $Sn_{2f}$ are included inside the cell 10$d$.

The secondary usage nodes $Sn_{1d}$ and $Sn_{2d}$ operate the second communication service inside an area 12d.

Further, the secondary usage nodes $Sn_{1f}$ and $Sn_{2f}$ operate the second communication service inside an area 12f. In this case, the frequency used for communication between the secondary usage nodes $Sn_{1d}$ and $Sn_{2d}$ and the frequency used for communication between the secondary usage nodes $Sn_{1f}$ and $Sn_{2f}$ are both F1. As a result, the secondary signals transmitted and received by the secondary usage node $Sn_{2d}$ and the secondary usage node $Sn_{2f}$ that are located in the part where the area 12d and the area 12f overlap with each other are likely to interfere with each other.

It is therefore understood that, when operating the second communication service by making secondary usage of the uplink channel of the OFDMA system, for example, in the spectrum assigned to the first communication service, it is desirable to give consideration to the existence of another second communication service at least in the same cell.

[1-5. Distribution of Transmission Powers Among Second Communication Services]

When the acceptable interference power of the second communication service is determined according to the above-described interference control model, if two or more second communication services exist in the same cell, it is necessary to further distribute a transmission power depending on the acceptable interference power among those second communication services. For example, in the case where a plurality of secondary usage nodes act as coordinators and start secondary usage of a spectrum, it is necessary to control their transmission powers so that the transmission powers of beacons that are transmitted from the respective coordinators satisfy the acceptable interference power as a whole. Further, the transmission power can be further distributed among the secondary usage nodes that subscribe to the second communication services. As a guideline for distributing the transmission power, three rules, i.e. equal type, unequal type and interfering margin reduction type, are proposed.

(Equal Type)

The equal type is a distribution rule that equally allocates transmission powers depending on the acceptable interference power that is determined according to the above-described interference control model to two or more second communication services. In the equal type distribution rule, the value $P_{tx\_secondary,i}$ of the transmission power which is allocated to the i-th (i=1, . . . , n) second communication service among n-number of second communication services is derived from the following expression.

$$P_{tx\_secondary,i} = 1/K \cdot \left( \frac{P_{rx\_primary,primary}}{SINR_{required}} - N_{primary} \right),$$ Expression (10)

$$K = \sum_{i=1}^{n} \frac{1}{L_{path\_tx\_secondary,i}}$$

The right side of the expression (10) is dividing the right side of the expression (9) by the factor K on the basis of path loss $L_{path\_tx\_secondary,i}$. Such a transmission power distribution rule equally provides the opportunity of communication to the coordinators of the respective second communication services, and it is fair and clear as a service from the user's point of view. However, the interference levels on the primary usage node caused by the respective secondary usage nodes are uneven. Note that, in the case of distributing the transmission power among the secondary usage nodes that subscribe to the second communication service, the value of n used to determine the factor K may be the total number of secondary usage nodes that subscribe to the second communication service instead of the total number of second communication services.

(Unequal Type)

The unequal type is a distribution rule that unequally allocates transmission powers depending on the acceptable interference power that is determined according to the above-described interference control model to two or more second communication services. In the unequal type distribution rule, the value $P_{tx\_secondary,i}$ of the transmission power depends on the distance between the secondary usage node and the interfered node and is derived from the following expression.

$$P_{tx\_secondary,i} =$$ Expression (11)
$$1/n \cdot \left( \frac{P_{rx\_primary,primary}}{SINR_{required}} - N_{primary} \right) \cdot L_{path\_tx\_secondary,i}$$

The right side of the expression (11) is assigning weights at the ratio of the path loss for each secondary usage node relative to the total sum of the path losses to the value obtained by dividing the right side of the expression (9) by the total number n of second communication services. With such a transmission power distribution rule, the secondary usage node that is more distant from the interfered node can gain larger opportunity of communication or communication distance. The entire communication range can be thereby maximized.

(Interfering Margin Reduction Type)

The interfering margin reduction type is a distribution rule that estimates the number of secondary usage nodes serving as the source of interference so as to include an extra number and thereby further reduces the possibility of causing interference on the primary usage node (i.e. provides "interference margin"). In the interfering margin reduction type distribution rule, the value $P_{t\_secondary,i}$ of the transmission power is derived from the following expression.

$$P_{tx\_secondary,i} = \left( \frac{P_{rx\_primary,primary}}{SINR_{required}} - N_{primary} \right) \cdot$$ Expression (12)
$$L_{path\_tx\_secondary,i} / N_{estimation}$$

In the expression (12), $N_{estimation}$ indicates the estimated total number of secondary usage nodes serving as the source of interference which is estimated inclusive of an extra number. For example, the value of $N_{estimation}$ may be set so that the transmission power decreases by 10 [dB] if the total number of secondary usage nodes serving as the source of interference is 10, and the transmission power decreases by 20 [dB] if it is 100.

The features of the three transmission power distribution rules are summarized in the following table 2.

TABLE 2

Table 2. Features of transmission power distribution rules

| | |
|---|---|
| Equal type | Communication opportunity is equally provided to respective communication services |
| | Fair and clear as service |
| | Interference levels on primary usage node are uneven |

TABLE 2-continued

Table 2. Features of transmission power distribution rules

| | |
|---|---|
| Unequal type | Larger communication opportunity or communication distance is obtained with distance from interfered node Entire communication range can be maximized |
| Interfering margin | Possibility of causing interference is further reduced by setting of interference margin |
| reduction type | Transmission power can be set autonomously by secondary usage node (coordinate) Communication opportunity or communication distance decreaseswith the estimated total number of interference sources |

It should be noted that a node that distributes a transmission power may distribute the transmission power according to one rule that is previously selected among the above-described three transmission power distribution rules. Alternatively, a node that distributes a transmission power may distribute the transmission power by adaptively selecting the rule that consequently maximizes an evaluation value such as the sum of capacities given to all secondary usage nodes (or secondary usage nodes with a high priority) or the total number of established secondary links.

[1-6. Scope of Term "Secondary Usage"]

In this specification, the term "secondary usage" typically means utilization of an additional or alternative communication service (a second communication service) using a part or whole of a spectrum assigned to a first communication service as described above. In this context about the meaning of the term "secondary usage", the first communication service and the second communication service may be services of different types or the same type. The services of different types may be selected from services such as digital TV broadcasting service, satellite communication service, mobile communication service, wireless LAN access service, P2P (Peer To Peer) connection service and the like. On the other hand, services of the same type may contain, for example, a relationship between a service of macro-cell provided by a communication carrier and a service of femto-cell operated by users or MVNO (Mobile Virtual Network Operator). Additionally, services of the same type may contain, for example, a relationship between a service provided by a base station of a communication service according to WiMAX, LTE (Long Term Evolution), LTE-A (LTE-Advanced) or the like and a service provided by relay station (relay node) to cover a spectrum hole. Further, a second communication service may be a service utilizing a plurality of fragmentary frequency bands aggregated using spectrum aggregation technology. Furthermore, a second communication service may be a supplementary communication service provided by femto-cells, relay stations or small or medium sized base stations for smaller service area than normal sized base stations within a service area of a normal sized base station. The subject matter of each embodiment described in this specification is applicable to every type of mode of such secondary usages.

In the foregoing, the proposed interference control model is described, and the main points of the relevant technical concerns are described sequentially. Based thereon, two embodiments of a transmission power control method for improving the capability of transmission power control on the occasion of secondary usage of a spectrum and suppressing interference on the primary system are described hereinbelow.

2. First Embodiment

[2-1. Overview of Communication System]

Figure 4:
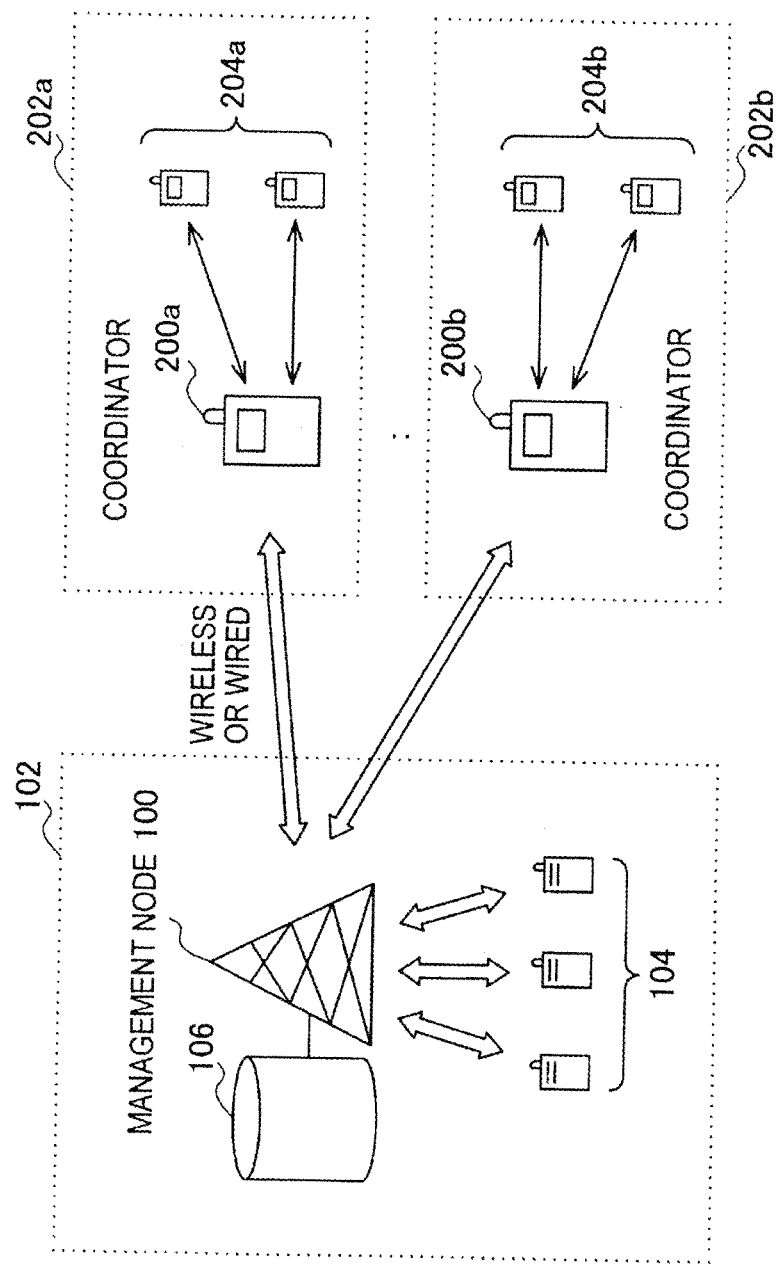
FIG. 4 is an explanatory view to describe an overview of a communication system according to a first embodiment.

FIG. 4 is an explanatory view to describe an overview of a communication system according to a first embodiment of the present invention.

FIG. 4 shows a primary system 102 that operates a first communication service and secondary systems 202a and 202b that respectively operate second communication services. The primary system 102 includes a management node 100 and a plurality of primary usage nodes 104.

The management node 100 is a primary usage node that has a role to manage secondary usage of the spectrum assigned to the first communication service. Although the management node 100 is a base station in the example of FIG. 4, the management node 100 is not limited thereto. Specifically, the management node 100 may be a primary usage node different from a base station, or it may be another node (e.g. a data server etc.) that is connected to a base station by wired or wireless means. In this embodiment, the management node 100 has access to a database 106 that stores location data indicating the locations of primary usage nodes included in the primary system 102.

The primary usage node 104 is a node that transmits and receives radio signals for the first communication service in the primary system 102. If the primary usage node 104 joins the primary system 102, location data indicating its location is registered into the database 106.

The database 106 is typically implemented as a geo-location database. In this embodiment, in response to a request from the management node 100, the database 106 outputs location data with respect to each primary usage node to the management node 100. Note that the database 106 may be integral with the management node 100 or it may be a separate unit from the management node 100.

On the other hand, the secondary system 202a includes a terminal device 200a and a plurality of secondary usage nodes 204a. Likewise, the secondary system 202b includes a terminal device 200b and a plurality of secondary usage nodes 204b.

The terminal devices 200a and 200b are secondary usage nodes that have a role of a coordinator (SSC: secondary spectrum coordinator) that operates to start secondary usage of the spectrum assigned to the first communication service. Specifically, the terminal devices 200a and 200b determine the availability of secondary usage according to a predetermined spectrum policy, receive allocation of a transmission power from the management node 100, and start the second communication service with the secondary usage nodes 204a or 204b. The terminal devices 200a and 200b may operate as an engine for cognitive radio (CE: Cognitive Engine), for example.

The secondary usage nodes 204a and 204b are nodes that respectively transmit and receive radio signals for the second communication service in the secondary systems 202a and 202b, respectively.

In the following description, when there is no particular need to distinguish between the terminal devices 200a and 200b, they are referred to collectively as the terminal device 200 by eliminating the alphabetical letter affixed to the reference numeral. The same applies to the secondary systems 202a and 202b (the secondary system 202) and the secondary usage nodes 204a and 204b (the secondary usage node 204).

[2-2. Exemplary Configuration of Management Node] (Description of Functional Blocks)

Figure 5:
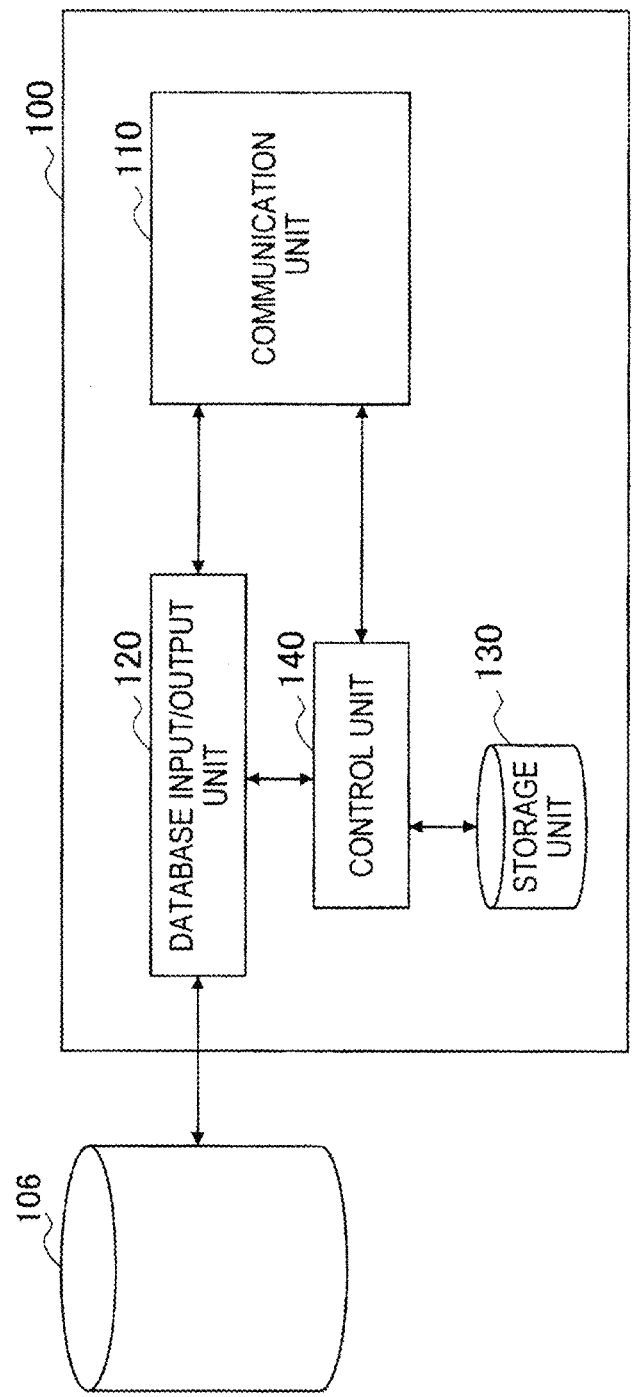
FIG. 5 is a block diagram showing an example of a logical configuration of a management node according to the first embodiment.

FIG. 5 is a block diagram showing an example of a logical configuration of the management node 100 shown in FIG. 4. Referring to FIG. 5, the management node 100 includes a communication unit 110, a database input/output unit 120, a storage unit 130 and a control unit 140.

The communication unit 110 transmits and receives radio signals to and from the primary usage nodes 104 by using a communication interface that can include an antenna, an RF circuit, a baseband circuit or the like in accordance with a given communication scheme of the first communication service. Further, the communication unit 110 receives location data of the terminal device 200 from the terminal device 200 and outputs the received location data to the control unit 140 as described in further detail later.

The database input/output unit 120 mediates the access from the control unit 140 to the database 106. Specifically, in response to a request from the control unit 140, the database input/output unit 120 acquires location data indicating the location of the primary usage node 104 from the database 106, and outputs the acquired location data to the control unit 140. Further, if the database input/output unit 120 receives location data from the primary usage node 104 that newly joins the primary system 102 through the communication unit 110, it registers the location data into the database 106. Further, the database input/output unit 120 may acquire the location data stored in the database 106 in response to an inquiry from an external device and output the acquired location data.

The storage unit 130 stores programs and data to be used for the operation of each unit of the management node 100 by using a recording medium such as hard disk or semiconductor memory, for example. Further, in this embodiment, the storage unit 130 stores various parameters necessary for calculation of the transmission power according to the above-described interference control model. The parameters stored in the storage unit 130 may include a parameter related to the quality of radio signals required in the first communication service (e.g. a required radio signal reception level and a signal to interference and noise ratio) and a parameter related to the interference or noise level in the first communication service. Note that the values of those parameters may be updated dynamically. For example, the value of the required quality of radio signals can be updated dynamically according to the type of an application to be provided to the primary usage node. Further, for example, the value of the interference or noise level can be updated dynamically by sensing through the communication unit 110.

The control unit 140 controls the overall functions of the management node 100 by using a control device such as a CPU (Central Processing Unit), for example. Further, in this embodiment, when the terminal device 200 makes secondary usage of the spectrum assigned to the first communication service, the control unit 140 determines the acceptable transmission power for the second communication service according to the above-described interference control model. A transmission power determination process that is performed by the control unit 140 is described in further detail later. Further, when there are two or more second communication services, the control unit 140 distributes the determined transmission power to the two or more second communication services. A transmission power distribution process that is performed by the control unit 140 is described in further detail later. The control unit 140 then notifies the determined or distributed transmission power value to each terminal device 200 through the communication unit 110.

(Flow of Transmission Power Determination Process)

Figure 6:
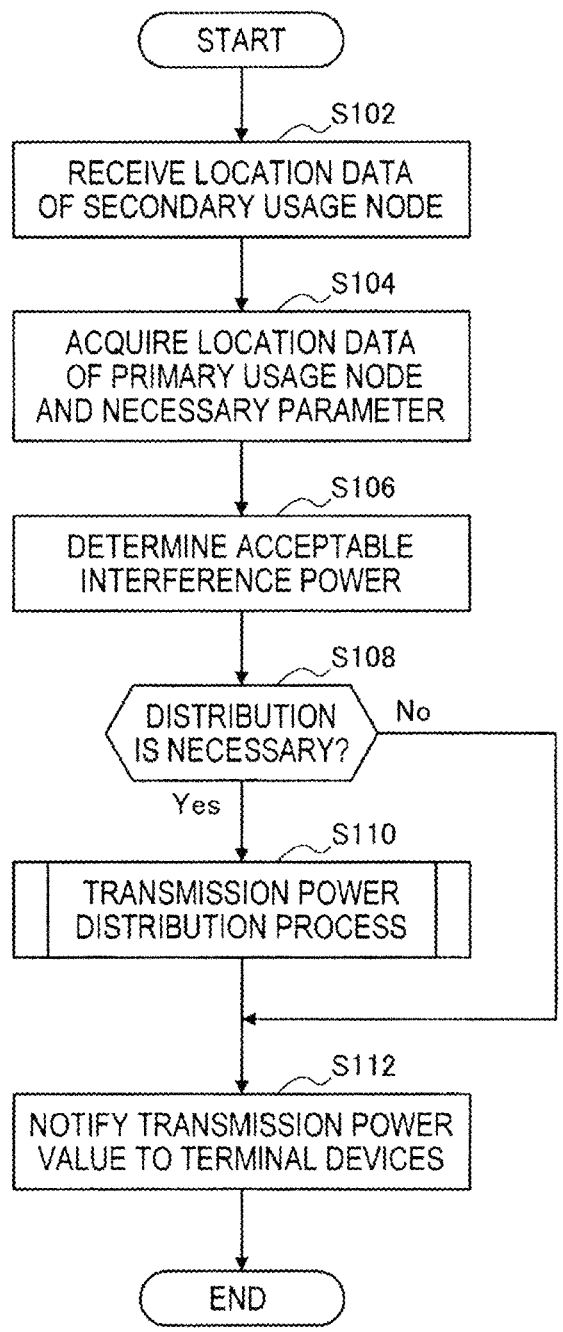
FIG. 6 is a flowchart showing an example of a flow of a transmission power determination process according to the first embodiment.

FIG. 6 is a flowchart showing an example of a flow of a transmission power determination process that determines the acceptable transmission power for the second communication service by the control unit 140 of the management node 100.

Referring to FIG. 6, the control unit 140 first receives location data of the terminal device 200 from the terminal device 200 through the communication unit 110 (step S102). In this specification, the location data may include values of latitude and longitude measured by using the GPS functions or coordinate values with a point of origin at a given control point measured by applying the direction of arrival estimation algorithm or the like, for example. Further, the control unit 140 may receive not only location data of the terminal device 200 but also location data of each secondary usage node 204 from the terminal device 200.

Next, the control unit 140 acquires location data of the primary usage node from the database 106 through the database input/output unit 120. Further, the control unit 140 acquires necessary parameters from the storage unit 130 (step S104). Note that, in the case where secondary usage is made on the uplink channel of the OFDMA system as in the example shown in FIG. 2A, the interfered node is the base station only. In such a case, the control unit 140 acquires only the location data of the management node 100, which is the base station, as the location data of the primary usage node. Further, the necessary parameters in the step S104 correspond to the quality of radio signals required in the first communication service, the interference or noise level in the first communication service (or a parameter for calculating those levels) or the like, for example.

Then, the control unit 140 determines the acceptable interference power of the second communication service based on the location data and the parameters that are received in the step S102 and acquired in the step S104, respectively (step S106). Specifically, the control unit 140 can determine the acceptable interference power of the second communication service according to the expression (9) in the above-described interference control model, for example. For example, the quality of radio signals required in the first communication service corresponds to the term $P_{rx\_primary,primary}/SINR_{required}$ in the expression (9). Further, the interference or noise level corresponds to the term $N_{Primary}$ in the expression (9). Further, the value of the path loss $L_{path\_tx\_secondary,i}$ in the expression (9) can be calculated according to the expression (6) by using the distance d that is derived from the location data of the primary usage node and the location data of each terminal device 200. Note that the control unit 140 may receive the value of each path loss $L_{path\_tx\_secondary,i}$ from the respective terminal devices 200 in the step S102 instead of calculating the value of each path loss $L_{path\_tx\_secondary,i}$ from the location data, for example. The value of the path loss $L_{path\_tx\_secondary,i}$ can be calculated as a difference between the transmission power value of a downlink signal from the base station and the reception level of the downlink signal in each terminal device 200.

Then, the control unit 140 determines whether it is necessary to distribute the value of the transmission power (step S108). For example, in the case where secondary usage is made by two or more terminal devices 200 as illustrated in FIG. 4, the control unit 140 determines that it is necessary to distribute the value of the transmission power among the two or more terminal devices 200. In this case, the process proceeds to the step S110 and the control unit 140 performs a transmission power distribution process (step S110). On the other hand, in the case where there is only one terminal device 200 that makes secondary usage and it is not necessary to distribute the value of the transmission power, the step S110 can be skipped.

After that, the control unit 140 notifies the value of the determined or distributed transmission power to each terminal device 200 through the communication unit 110 (step S112). Note that the control unit 140 may notify additional information such as a policy (e.g. a transmission spectrum mask, a modulation method etc.) to be complied with by the secondary usage node when making secondary usage of a spectrum, in addition to the value of the transmission power, to each terminal device 200. After that, the second communication service can be started between the terminal device 200 and each secondary usage node 204.

(Flow of Transmission Power Distribution Process)

Figure 7:
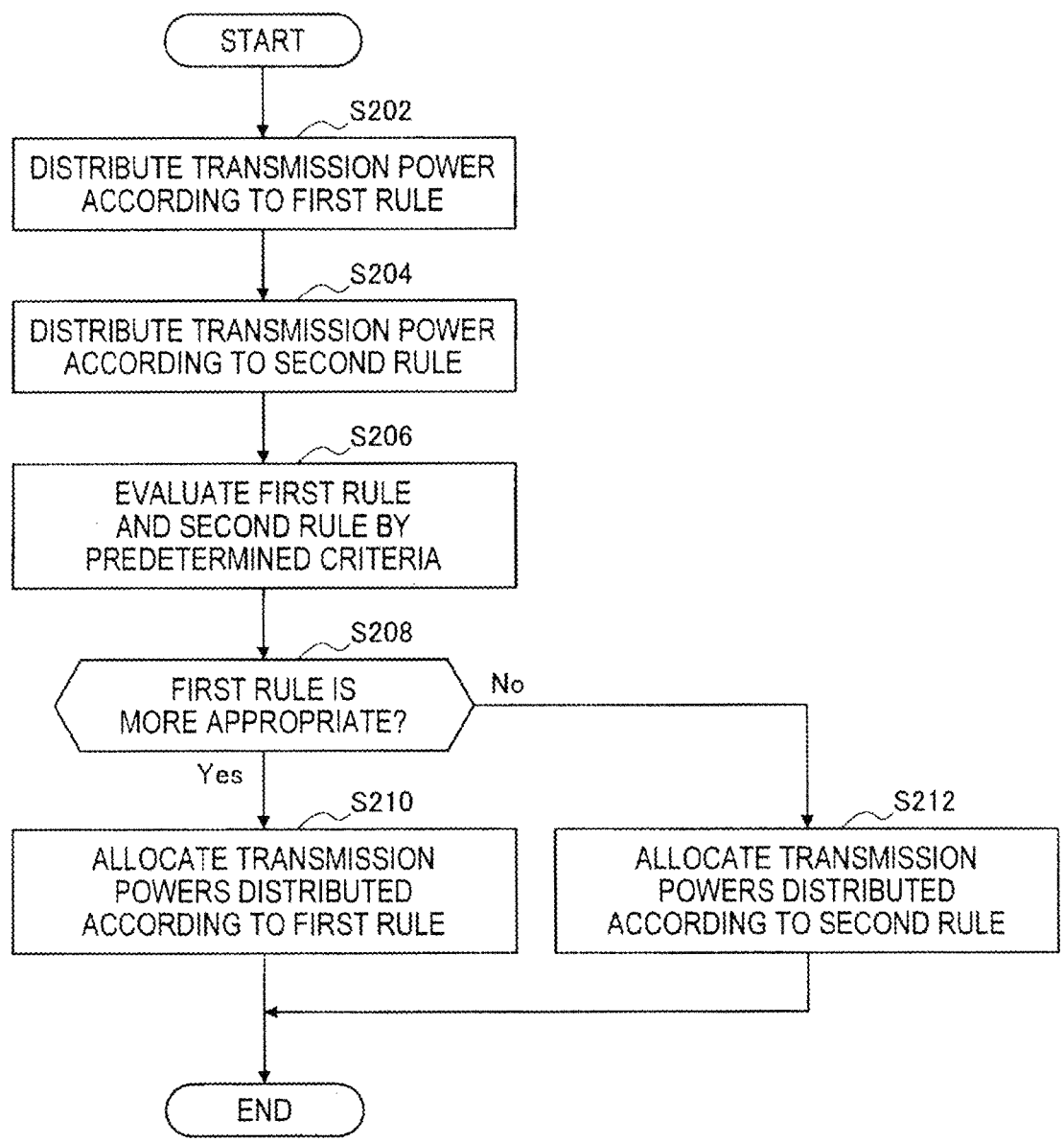
FIG. 7 is a flowchart showing an example of a flow of a transmission power distribution process according to the first embodiment.

FIG. 7 is a flowchart showing an example of a flow of a transmission power distribution process by the control unit 140 of the management node 100 in the case where two or more terminal devices 200 exist, namely, where two or more second communication services are operated in the same cell.

Referring to FIG. 7, the control unit 140 first distributes the transmission power depending on the acceptable interference power that is determined in the step S106 of FIG. 6 according to the first rule (step S202). Next, the control unit 140 distributes the transmission power depending on the acceptable interference power same as in the step S202 according to the second rule (step S204). The first rule and the second rule may be the above-described equal type transmission power distribution rule and the unequal type transmission power distribution rule, respectively, for example.

Then, the control unit 140 evaluates the transmission power distributed according to the first rule and the transmission power distributed according to the second rule by predetermined evaluation criteria (step S206). The predetermined evaluation criteria may be the total capacity that is provided to all terminal devices 200 in the end, for example. In this case, the total capacity C can be evaluated according to the following expression.

$$C = \sum_{i=1}^{n} C_i = \sum_{i=1}^{n} \left( \log_2 \left( 1 + \frac{P_{tx\_secondary,i}}{N_i} \right) \right)$$ Expression (13)

In the above expression, $P_{tx\_secondary,i}$ indicates the transmission power distributed to the i-th terminal device 200, and $N_i$ indicates the noise level of the i-th terminal device 200.

Further, in the expression (13), the control unit 140 may count only the terminal devices 200 with a high priority, out of the n-number of terminal devices 200, for calculating the total capacity. The priority can be assigned depending on the type, contents or the like of the second communication service, for example. For example, a high priority can be assigned to the service for which small delay is needed, such as motion picture delivery or network game, for example. Further, a high priority can be assigned to the service to which high service charge is set so as to ensure a certain service quality. Then, the priority can be received together with the location data of the terminal device 200 in the step S102 of FIG. 6, for example.

Further, the control unit 140 may evaluate the total number of links of the second communication services that can be established by using the distributed transmission powers in the step S206 instead of evaluating the capacity as in the expression (13). In this case, the control unit 140 first determines whether each pair of secondary usage nodes which desire for communication can establish communication according to the transmission powers distributed to the respective terminal devices 200. Then, the number of links determined that communication can be established is counted as the total number of links of the second communication services.

Then, the control unit 140 determines which of the first rule and the second rule is more appropriate by comparing the capacity or the total number of links evaluated in the step S206 (step S208). For example, when the transmission powers distributed according to the first rule can achieve the larger capacity than the transmission powers distributed according to the second rule, the control unit 140 can determine that the first rule is more appropriate. Further, when the transmission powers distributed according to the second rule can achieve the larger capacity than the transmission powers distributed according to the first rule, the control unit 140 can determine that the second rule is more appropriate. When it is determined that the first rule is more appropriate, the process proceeds to the step S210. On the other hand, when it is determined that the second rule is more appropriate, the process proceeds to the step S212.

In the step S210, the transmission powers distributed according to the first rule that is determined to be more appropriate are allocated to the respective terminal devices 200 (step S210). On the other hand, in the step S212, the transmission powers distributed according to the second rule that is determined to be more appropriate are allocated to the respective terminal devices 200 (step S212). After that, the transmission power distribution process shown in FIG. 7 ends.

Note that the case where the first rule and the second rule that can respectively correspond to the equal type and the unequal type are evaluated in terms of the capacity or the number of links that can be established is particularly described above. However, it is not limited thereto, and the transmission power distribution rules other than the equal type and the unequal type may be adopted. Further, three or more transmission power distribution rules may be evaluated.

[2-3. Exemplary Configuration of Terminal Device]

(Description of Functional Blocks)

Figure 8:
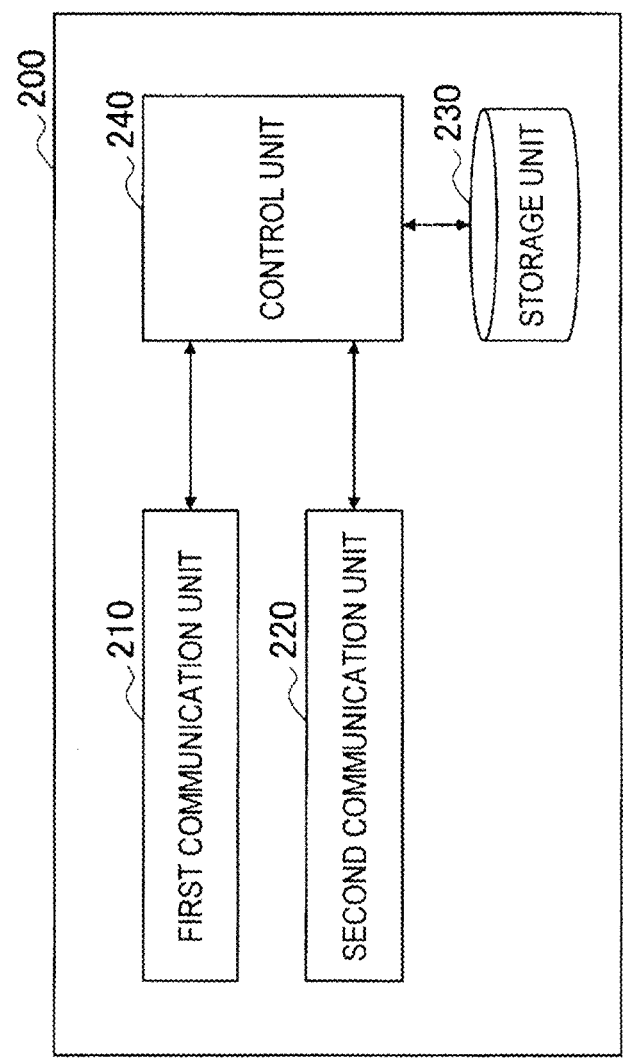
FIG. 8 is a block diagram showing an example of a logical configuration of a terminal device according to the first embodiment.

FIG. 8 is a block diagram showing an example of a logical configuration of the terminal device 200 shown in FIG. 4. Referring to FIG. 8, the terminal device 200 includes a first communication unit 210, a second communication unit 220, a storage unit 230 and a control unit 240. In this embodiment, the terminal device 200 can communicate with the management node 100 through the first communication unit 210 and also transmit and receive radio signals for the second communication service through the second communication unit 220.

The first communication unit 210 communicates with the management node 100 in accordance with a given communication scheme. A channel used for communication between the first communication unit 210 and the management node 100 may be a cognitive pilot channel (CPC), which is a control channel, for example. The CPC may include an inbound CPC in which CPC information is extrapolated in an existing communication system (e.g. the primary system 102) or an outbound CPC which is a dedicated channel in which CPC information is interpolated, for example.

For example, the first communication unit 210 transmits location data indicating the location of its own device to the management node 100 in response to an instruction (an instruction operation by a user or a request from another node) for start of secondary usage of a spectrum or the like.

After that, the first communication unit 210 receives the value of the acceptable transmission power which is determined according to the above-described technique from the management node 100 and outputs it to the control unit 240.

The second communication unit 220 transmits and receives radio signals to and from the secondary usage node 204 in accordance with a given communication scheme. For example, when the terminal device 200 operates as the coordinator of the second communication service, the second communication unit 220 first performs sensing of radio signals of the first communication service and achieves synchronization of the uplink channel. Then, the second communication unit 220 transmits a beacon to the secondary usage nodes 204 in the nearby vicinity on a regular basis by using the synchronized uplink channel. The transmission power used by the second communication unit 220 is limited to the range that does not cause substantial interference on the primary usage node under control of the control unit 240.

Note that, when the communication link between the first communication unit 210 and the management node 100 is a radio link, the first communication unit 210 and the second communication unit 220 may share the physically identical communication interface that can include an antenna, an RF circuit, a baseband circuit or the like. The communication link between the first communication unit 210 and the management node 100 is called a backhaul link in some cases.

The storage unit 230 stores programs and data to be used for the operation of each unit of the terminal device 200 by using a recording medium such as hard disk or semiconductor memory, for example. Further, in this embodiment, the storage unit 230 stores various parameters for operation of the second communication service and control of the transmission power. The parameters stored in the storage unit 230 may include the location data of its own device (and other secondary usage nodes that subscribe to the second communication service according to need), the acceptable transmission power notified from the management node 100, a spectrum mask, a modulation method or the like, for example.

The control unit 240 controls the overall functions of the terminal device 200 by using a control device such as a CPU, for example. For example, in this embodiment, the terminal device 240 controls the value of the transmission power used for transmission of radio signals by the second communication unit 220 within the range of the acceptable transmission power notified from the management node 100.

(Flow of Transmission Power Control Process)

Figure 9:
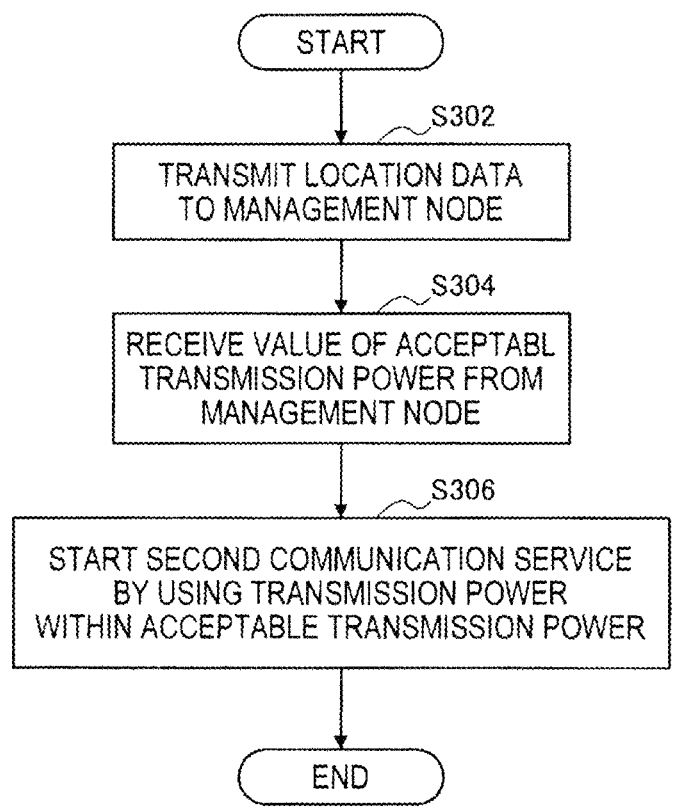
FIG. 9 is a flowchart showing an example of a flow of a transmission power control process in a terminal device according to the first embodiment.

FIG. 9 is a flowchart showing an example of a flow of a transmission power control process by the terminal device 200.

Referring to FIG. 9, upon detection of an instruction for start of secondary usage, for example, the first communication unit 210 transmits the location data of the terminal device 200 to the management node 100 (step S302). In this step, not only the location data of the terminal device 200 but also the location data of other secondary usage nodes 204 may be transmitted to the management node 100.

Next, the first communication unit 210 receives the value of the acceptable transmission power which is determined according to the above-described interference control model from the management node 100 (step S304). In this step, additional information such as a transmission spectrum mask or a modulation method can be received in addition to the acceptable transmission power, for example.

Then, the control unit 240 starts the second communication service by controlling the transmission power used by the second communication unit 220 so as to be within the range of the acceptable transmission power that is received in the step 304 (step S306). Note that, when starting the second communication service, the control unit 240 may make a beacon transmitted from the terminal device 200 to the nearby secondary usage nodes include the value of the acceptable transmission power allocated to the second communication service. The other secondary usage nodes that subscribe to the second communication service can thereby also adjust their transmission powers so as not to cause substantial interference on the primary usage node.

[2-4. Summary of First Embodiment]

The first embodiment of the present invention is described above with reference to FIGS. 4 to 9. In this embodiment, transmission powers allocated to the second communication service that makes secondary usage of the spectrum assigned to the first communication service is determined by the management node 100, which is the primary usage node that can access to the database 106, depending on the acceptable interference power determined according to the above-described interference control model. Then, the determined transmission powers are notified from the management node 100 to terminal devices 200, which are the secondary usage nodes acting as the coordinator of the second communication services. The terminal devices 200 can thereby make adaptive control of the transmission power to be used for a second communication service so that interference on the primary system 102 is within the acceptable level.

Further, according to the above-described interference control model, a transmission power is determined so that interference on the interfered node is within the acceptable level based on the quality of radio signals required in the first communication service, the interference or noise level in the first communication service, and the path loss on the communication path about one or more secondary usage nodes. It is thereby possible to eliminate (or at least reduce) the possibility that it becomes difficult to receive a primary signal locally in a certain primary usage node.

Further, the path loss on the communication path mentioned above can be calculated dynamically based on the location of the primary usage node and the location of the secondary usage node. Therefore, even when the location of the terminal device 200 changes, it is possible to determine the transmission power in an adaptive manner so that interference on the interfered node is within the acceptable level.

Further, according to the embodiment, in the case where two or more second communication services are operated, the transmission power depending on the acceptable interference power determined according to the above-described interference control model is distributed among the respective second communication services according to the more appropriate rule between the first rule and the second rule. The first rule and the second rule may be the equal type distribution rule and the unequal type distribution rule described above, for example. The equal type distribution rule can distribute the opportunity of communication (the capacity, the number of communication links etc.) in a fair and clear manner from the user's point of view. Further, the unequal type distribution rule can distribute the transmission power so as to maximize the communication range as a whole because a higher transmission power is allocated to the secondary usage node that is more distant from the interfered node.

Furthermore, the more appropriate rule between the first rule and the second rule may be the rule with which the total capacity that is achieved in the end by using the allocated transmission powers is larger, for example. In this case, it is possible to maximize the capacity that is effectively utilized by secondary usage of a spectrum.

Further, the more appropriate rule between the first rule and the second rule may be the rule with which the total capacity related to the second communication services with a high priority is larger in the capacity that is achieved in the end by using the allocated transmission powers, for example. In this case, it is possible to selectively increase the capacity by secondary usage of a spectrum so as to particularly satisfy the requirements of each application, the QoS requirements agreed by a user or the like.

Further, the more appropriate rule between the first rule and the second rule may be the rule with which the number of links that can be established in the end by using the allocated transmission powers is larger, for example. In this case, it is possible to maximize the number of users who can gain the opportunity of communication by secondary usage of a spectrum.

Note that, in this embodiment, the case where the transmission power used in the second communication service is controlled at the start of the second communication service is described. However, the processes shown in FIGS. 6, 7, and 9 may be executed after the start of the second communication service, e.g. when the secondary usage node is moved or when the number of secondary usage nodes is changed, for example.

Further, the case where secondary usage is made on the uplink channel of the first communication service, i.e. when only the base station of the first communication service is taken into consideration as an interfered node is described in this embodiment. However, the present invention is applicable to the case where a plurality of interfered nodes exist as a matter of course.

[2-5. Alternative Example]

In the above-described interference control model, the acceptable transmission power for the second communication service is determined so that interference on the interfered node among the primary usage nodes is suppressed within the acceptable level. On the other hand, the transmission power used for the second communication service may be determined in consideration of the communication quality in the secondary usage node also.

When one secondary usage node is regarded as an interfered node, it is necessary to satisfy the following relational expression (14) in order that the interference is accepted.

$$SINR_{i\_required\_secondary} \leq \frac{P_{i\_rx\_secondary, j\_tx\_secondary}}{(I_{i,primary} + I_{i,k(k \neq i, k \neq j)\_tx\_secondary}) + N_i}$$

Expression (14)

In the above expression, $SINR_{i\_required\_secondary}$ indicates the minimum SINR that is required in the i-th secondary usage node, which is the interfered node. $SINR_{i\_required\_secondary}$ may be the minimum receiving sensitivity of the interfered node, the minimum SINR given according to QoS or the like, for example. Further, $P_{i\_rx\_secondary, j\_tx\_secondary}$ indicates the reception level that is required for a radio signal (secondary signal) of the second communication service which is transmitted from the j-th secondary usage node to the i-th secondary usage node. Further, $I_{i,primary}$ indicates the interference level by radio signals of the first communication service, $I_{i,k(k \neq i, k \neq j)\_tx\_secondary}$ indicates the interference level by secondary signals from other secondary usage nodes which are not the i-th or j-th secondary usage node (i.e. which are not relevant to a desired communication link) Further, $N_i$ indicates the noise level applicable to the i-th secondary usage node. Note that the interference level $I_{i,k(k \neq i, k \neq j)\_tx\_secondary}$ by secondary signals from other secondary usage nodes can be calculated by subtracting the total sum of the path losses regarding the secondary usage nodes from the total sum of the transmission powers of the secondary usage nodes which are not relevant to a desired communication link.

Therefore, the management node 100 according to the above-described first embodiment may distribute the transmission power in such a way that the transmission power allocated to each terminal device 200 satisfies the above expression (14) in the transmission power determination process in the step S110 shown in FIG. 6, for example.

3. Second Embodiment

In the first embodiment of the present invention, transmission powers allocated to the second communication service is determined by the primary usage node (management node) which is accessible to the database that stores the location data of the primary usage node. This is a passive technique from the viewpoint of the terminal device (UE) that makes secondary usage. On the other hand, the terminal device that makes secondary usage may acquire necessary parameters and determine the acceptable transmission power for the second communication service in an active manner. In this section, a case where the terminal device that makes secondary usage actively determines the acceptable transmission power is described as a second embodiment of the present invention.

[3-1. Overview of Communication System]

Figure 10:
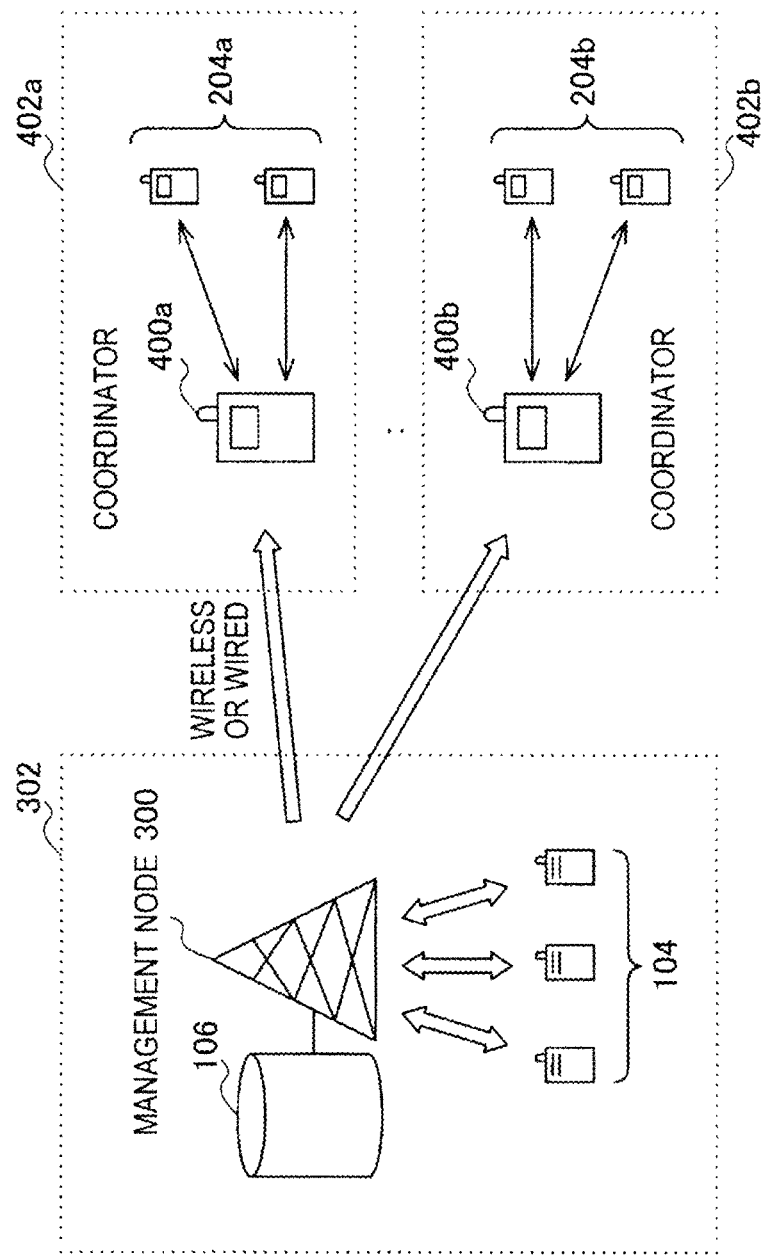
FIG. 10 is an explanatory view to describe an overview of a communication system according to a second embodiment.

FIG. 10 is an explanatory view to describe an overview of a communication system according to the second embodiment of the present invention.

FIG. 10 shows a primary system 302 that operates a first communication service and secondary systems 402a and 402b that respectively operate second communication services. The primary system 302 includes a management node 300 and a plurality of primary usage nodes 104.

The management node 300 is a primary usage node that has a role to manage secondary usage of the spectrum assigned to the first communication service. Although the management node 300 is a base station in the example of FIG. 10, the management node 300 is not limited thereto. In this embodiment, the management node 300 has access to a database 106 that stores location data indicating the locations of primary usage nodes that are included in the primary system 302.

On the other hand, the secondary system 402a includes a terminal device 400a and a plurality of secondary usage nodes 204a. Likewise, the secondary system 402b includes a terminal device 400b and a plurality of secondary usage nodes 204b.

The terminal devices 400 (400a and 400b) are secondary usage nodes that have a role of a coordinator (SSC) that operates to start secondary usage of the spectrum assigned to the first communication service. Specifically, the terminal devices 400 determine the availability of secondary usage according to a predetermined spectrum policy, determines the acceptable transmission power by acquiring necessary parameters from the management node 300, and then starts the second communication services with the secondary usage nodes 204. The terminal devices 400 may operate as an engine for cognitive radio (CE), for example.

[3-2. Exemplary Configuration of Management Node]

Figure 11:
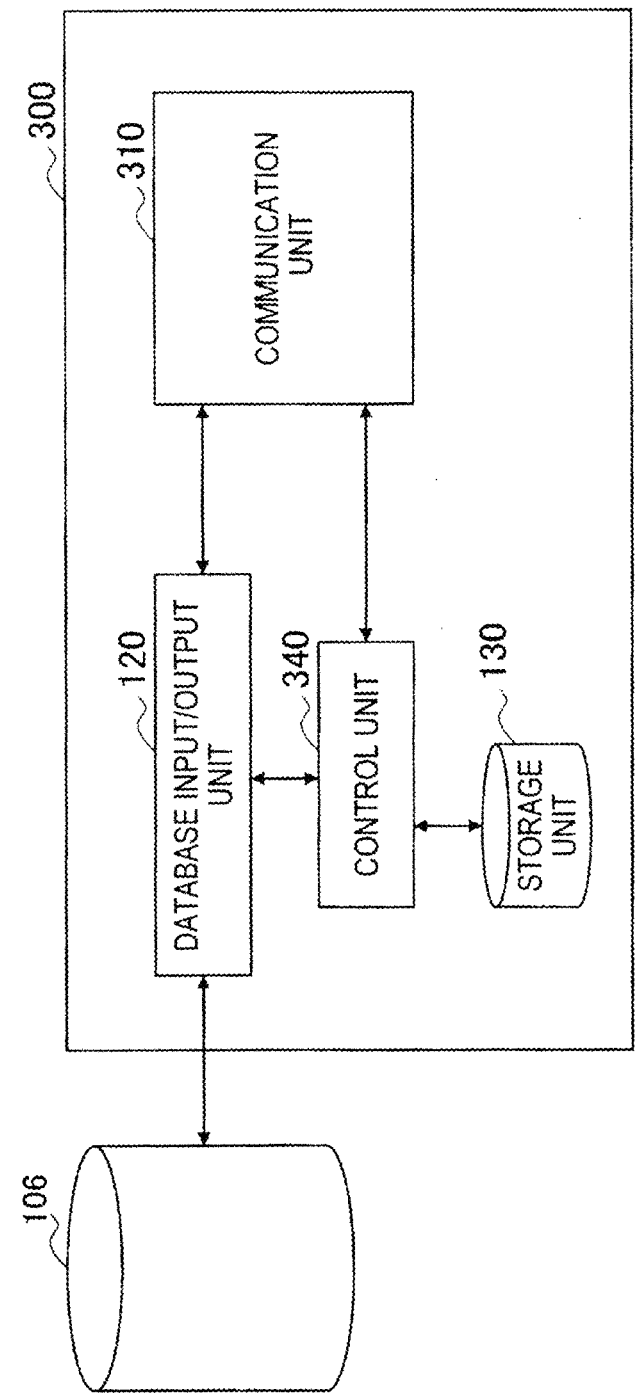
FIG. 11 is a block diagram showing an example of a logical configuration of a management node according to the second embodiment.

FIG. 11 is a block diagram showing an example of a logical configuration of the management node 300 shown in FIG. 10. Referring to FIG. 11, the management node 300 includes a communication unit 310, a database input/output unit 120, a storage unit 130 and a control unit 340.

The communication unit 310 transmits and receives radio signals to and from the primary usage nodes 104 by using a communication interface that can include an antenna, an RF circuit, a baseband circuit or the like in accordance with a given communication scheme of the first communication service. Further, the communication unit 310 transmits the location data of the primary usage nodes 104 stored in the database 106 and parameters to be used for determination of a transmission power stored in the database 106 or the storage unit 130 to the terminal device 400.

The control unit 340 controls the overall functions of the management node 300 by using a control device such as a CPU, for example. Further, in this embodiment, the control unit 340 transmits the above-described location data and parameters to be used when the terminal device 400 determines the acceptable transmission power according to the above-described interference control model to the terminal device 400 through the communication unit 310 (or another backhaul link). The location data and parameters may be transmitted on a regular basis by using a predetermined channel such as CPC, for example. Alternatively, the location data and parameters may be transmitted in response to a transmission request from the terminal device 400, for example.

[3-3. Exemplary Configuration of Terminal Device]
(Description of Functional Blocks)

Figure 12:
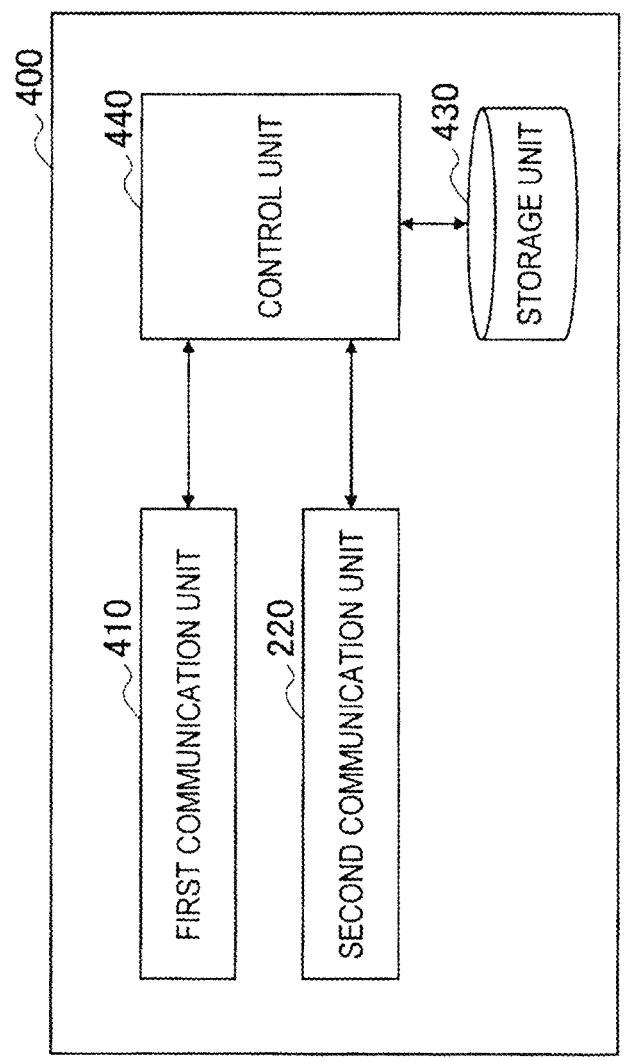
FIG. 12 is a block diagram showing an example of a logical configuration of a terminal device according to the second embodiment.

FIG. 12 is a block diagram showing an example of a logical configuration of the terminal device 400 shown in FIG. 10. Referring to FIG. 12, the terminal device 400 includes a first communication unit 410, a second communication unit 220, a storage unit 430 and a control unit 440.

The first communication unit 410 receives radio signals containing the data and parameters transmitted from the management node 300 in accordance with a given communication scheme. A channel used for communication between the first communication unit 410 and the management node 300 may be the above-described CPC, which is a control channel, for example.

Specifically, the first communication unit 410 attempts to receive the data and parameters to be used for determination of a transmission power from the management node 300 in response to an instruction for start of secondary usage of a spectrum or the like, for example. The data and parameters to be used for determination of a transmission power include the location data of an interfered node, the quality of radio signals required in the first communication service, the interference or noise level in the first communication service or the like, for example. Further, the data to be used for determination of a transmission power may include location data indicating the locations of other secondary usage nodes. If the first communication unit 410 receives the data and parameters from the management node 300, it outputs the received data and parameters to the control unit 440. If, on the other hand, the first communication unit 410 fails to receive the necessary data and parameters for some reasons such as unsuitable signal reception environment, it provides notification to the control unit 440.

The storage unit 430 stores programs and data to be used for the operation of each unit of the terminal device 400 by using a recording medium such as hard disk or semiconductor memory, for example. Further, in this embodiment, the storage unit 430 stores various parameters for determination of a transmission power for the second communication service and control of the transmission power. The parameters stored in the storage unit 430 may include the location data of its own device (and other secondary usage nodes that subscribe to the second communication service according to need), the parameters received from the management node 300 through the first communication unit 410 or the like, for example.

The control unit 440 controls the overall functions of the terminal device 400 by using a control device such as a CPU, for example. For example, in this embodiment, when making secondary usage of the spectrum assigned to the first communication service, the control unit 440 determines the acceptable transmission power for the second communication service depending on the determined acceptable interference power according to the above-described interference control model. If the control unit 440 fails to receive radio signals from the management node 300 and is thus unable to acquire the latest location data of the primary usage node and necessary parameters, it determines the acceptable transmission power by counting in the margin for reducing the possibility that causes interference on the primary usage node. The transmission power determination process is described in detail later. Then, the control unit 440 controls the value of the transmission power to be used for transmission of radio signals by the second communication unit 220 to fall within the range of the determined acceptable transmission power.

(Flow of Transmission Power Determination Process)

Figure 13:
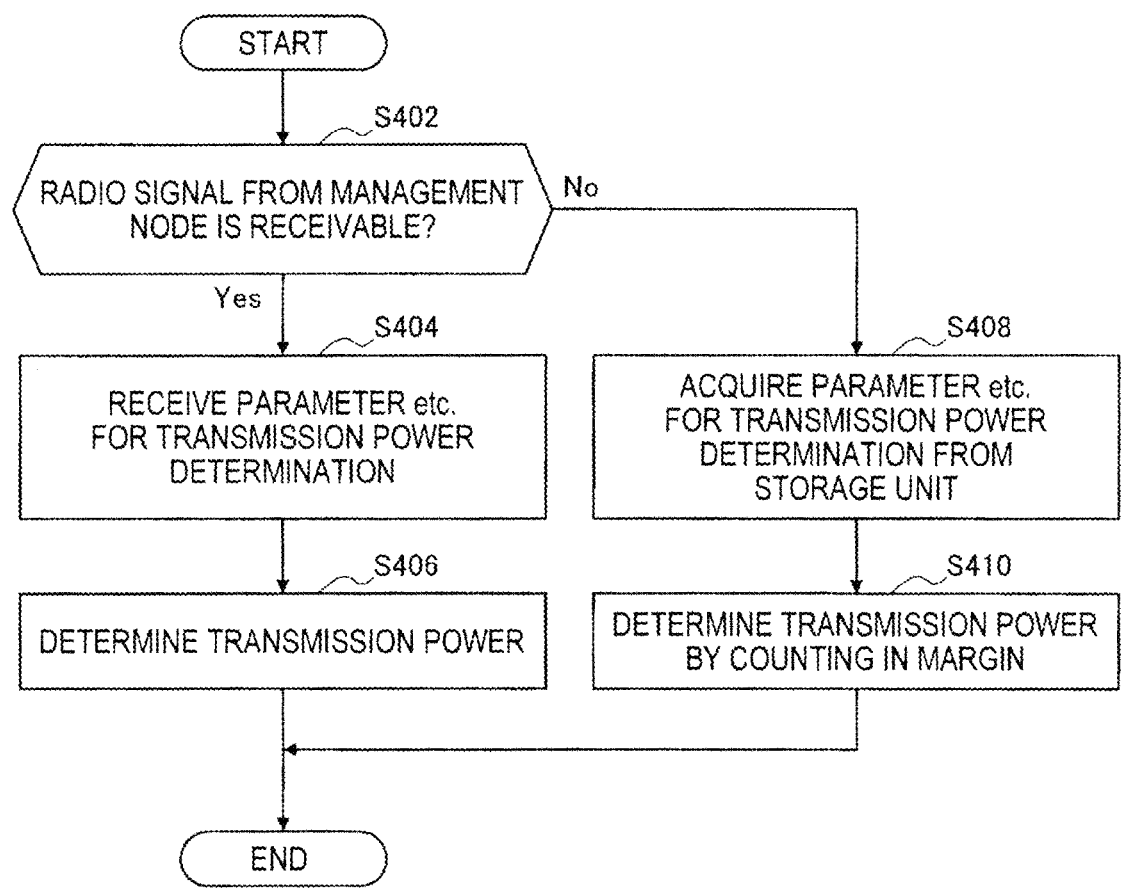
FIG. 13 is a flowchart showing an example of a flow of a transmission power determination process according to the second embodiment.

FIG. 13 is a flowchart showing an example of a flow of a transmission power determination process for the control unit 440 to determine the acceptable transmission power for the second communication service.

Referring to FIG. 13, the control unit 440 first determines whether radio signals are receivable from the management node 300 through the first communication unit 410 (step S402). If radio signals from the management node 300 are receivable, the process proceeds to the step S404. If, on the other hand, radio signals from the management node 300 are not receivable, the process proceeds to the step S408.

In the step S404, the control unit 440 acquires the location data of the primary usage node serving as an interfered node that is received from the management node 300 through the first communication unit 410. Further, the control unit 440 acquires the parameters received from management node 300 in the same manner (step S404). Note that, in the case where secondary usage is made on the uplink channel of the OFDMA system as in the example shown in FIG. 2A, the interfered node is the base station only. In such a case, the control unit 440 acquires only the location data of the management node 300, which is the base station, as the location data of the primary usage node. Further, the necessary parameters in the step S404 correspond to the quality of radio signals required in the first communication service, the interference or noise level in the first communication service (or a parameter for calculating those levels) or the like, for example.

Then, the control unit 440 determines the transmission power depending on the acceptable interference power of the second communication service based on the location data and parameters received in the step S404 (step S406). Specifically, the control unit 440 can determine the transmission power depending on the acceptable interference power of the second communication service according to the expression (9) in the above-described interference control model, for example. For example, the quality of radio signals required in the first communication service corresponds to the term $P_{rx\_primary,primary}/SINR_{required}$ in the expression (9). Further, the interference or noise level corresponds to the term $N_{Primary}$ in the expression (9). Further, the value of the path loss $L_{path\_tx\_secondary,i}$ in the expression (9) can be calculated according to the expression (6) by using the distance d that is derived from the location data of the primary usage node and the location data of the terminal device 400. Note that the control unit 440 may calculate the value of the path loss $L_{path\_tx\_secondary,i}$ as a difference between the transmission power value of a downlink signal from the base station and the reception level of the downlink signal instead of calculating it from the location data. Further, when another second communication service exists, the control unit 440 may distribute the transmission power according to the expression (10) of the equal type or the expression (11) of the unequal type.

On the other hand, if radio signals from the management node 300 are not receivable, in the step S408, the control unit 440 acquires the location data and parameters for determining a transmission power from the storage unit 430 (step S408). For example, the control unit 440 may receive the location data of the interfered node and necessary parameters through the first communication unit 410 when communication with the management node 300 becomes available and store them into the storage unit 430 for later use. Further, when the types of the first communication service which is the target of secondary usage are limited to several candidates in advance, for example, a parameter indicating the quality of radio signals required in the first communication service may be stored as a default value in the storage unit 430.

Then, the control unit 440 determines the transmission power depending on the acceptable interference power of the second communication service based on the location data and parameters acquired in the step S408 (step S410). In this case, however, there is a possibility that the parameters used for determination of the transmission power are not the latest. Thus, the control unit 440 adds a given margin to the value of the transmission power so as to reduce the possibility that causes interference on the primary usage node. Specifically, the control unit 440 can determine the transmission power according to the expression (12) of the interfering margin reduction type described above, for example. The value of $N_{estimation}$ in the expression (12) is determined to be inclusive of an extra number according to the number of secondary usage nodes 204 that possibly subscribe to the second communication service, for example.

After that, the transmission power determination process by the control unit 440 ends. Then, the second communication service is started between the terminal device 400 and the respective secondary usage nodes 204 by using the power level within the range of the determined acceptable interference power.

[3-4. Summary of Second Embodiment]

The second embodiment of the present invention is described above with reference to FIGS. 10 to 13. In this embodiment, the acceptable transmission power for the second communication service that makes secondary usage of the spectrum assigned to the first communication service is determined by the terminal device 400 which acts as the coordinator of the second communication service according to the above-described interference control model. The terminal device 400 can thereby determine the transmission power to be used for the second communication service in an active manner and control the transmission power so as to suppress interference on the primary system 302.

Further, if the control unit 440 fails to receive radio signals from the management node 300 and is thus unable to acquire the latest location data of the primary usage node, the range of the transmission power is determined by counting in the margin for reducing the possibility that causes interference on the primary usage node. The terminal device 400 can thereby start secondary usage of a spectrum autonomously and safely even when the terminal device 400 is located in the area where signal receiving conditions are relatively unsuitable due to shadowing (shielding), fading or the like.

Further, with the technique of the above-described interfering margin reduction type, the margin is determined according not to the actual number of secondary usage nodes, but to an assumed value that is estimated inclusive of an extra number. It is thereby possible to prevent degradation of the quality of the first communication service even when the number of secondary usage nodes that subscribe to the second communication service increases within an expected range.

4. Application to TV Band

Figure 14:
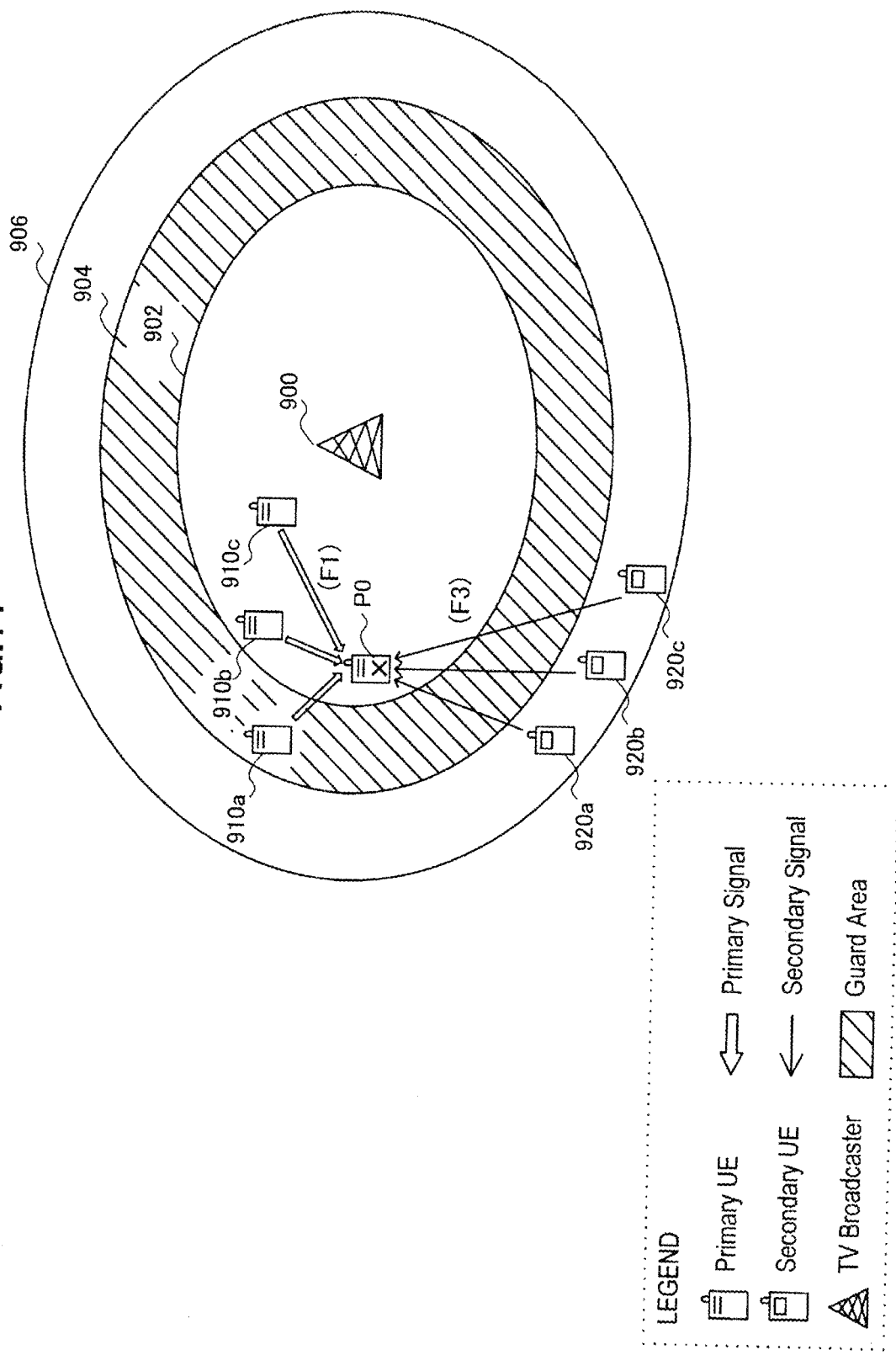
FIG. 14 is an explanatory view to describe an application to TV band.

FIG. 14 is an explanatory view to describe an application of the above-mentioned first or second embodiment to TV band. In the example of FIG. 14, a primary usage node 900 is a broadcast station of TV broadcast (TV broadcaster). Primary usage nodes 910a to 910c are receiving station of TV broadcast. The primary usage node 900 provides a digital TV broadcast service on a frequency band F1 to the primary usage nodes 910a to 910c located inside the border 902 or 904. The inside area of the border 902 is a service area of the digital TV broadcast service. The shaded area between the border 902 and border 904 is a guard area where secondary usage of spectrum is restricted. Meanwhile, the area between the border 904 and border 906 is a TV white space. Secondary usage nodes 920a to 920c are located in this TV white space and operate second communication services on a frequency channel F3 which is different from the frequency band F1, for example. However, even if a guard band is set between the frequency band F1 for the first communication service and the frequency band F3 for the second communication service, there is a risk that a fatal interference occurs not only on the secondary system but also on the primary system at position P0, for example. Such a risk might be reduced by expanding the width of the guard area. However, expanding the width of the guard area leads to a decrease of an opportunity of secondary usage of spectrum. From this point of view, to control a transmission poser of a second communication service according to the above-mentioned first or second embodiment allows for reducing interference on the primary system to fall within an acceptable range without excessively expanding the width of the guard area.

It should be noted that a series of processing according to the first and second embodiments described in this specification may be implemented on either hardware or software. In the case of executing a series or part of processing on software, a program constituting the software is prestored in a recording medium such as ROM (Read Only Memory), read into RAM (Random Access Memory) and then executed by using a CPU or the like.

The subject matter of each embodiment described in this specification is applicable to various types of modes of secondary usage. For example, as described above, it can be said that operation of relay node or femto-cell to cover a spectrum hole of the first communication service is a mode of secondary usage of spectrum. Further, the relationship between any one or more of macro-cell, RRH (Remote Radio Head), Hotzone, relay node, femto-cell and the like may form a mode of secondary usage of spectrum (such as heterogeneous network).

Although preferred embodiments of the present invention are described in detail above with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-179367 filed in the Japan Patent Office on Jul. 31, 2009, Japanese Priority Patent Application JP 2010-005230 filed in the Japan Patent Office on Jan. 13, 2010 and Japanese Priority Patent Application JP 2010-110012 filed in the Japan Patent Office on May 12, 2010, the entire contents of which are hereby incorporated by reference.

What is claimed is:

1. A method for determining an acceptable transmission power for a second communication service making secondary usage of a spectrum assigned to a first communication service, comprising the steps of:
    determining the acceptable transmission power based on an interference level or a noise level in the first communication service, and a path loss on a communication path about one or more secondary usage node that transmits a radio signal of the second communication service; and
    if two or more second communication services exist in an area, distributing the transmission power among the two or more second communication services evenly, wherein a value Ptx_secondary,i of the transmission power which is allocated to the i-th (i=1, . . . , n) second communication service is derived from the following expression:

$$P_{tx\_secondary,i} = 1/K \cdot \left( \frac{P_{rx\_primary,primary}}{SINR_{required}} - N_{primary} \right),$$

$$K = \sum_{i=1}^{n} \frac{1}{L_{path\_tx\_secondary,i}}.$$

2. The method according to claim 1, further comprising:
    acquiring location data from a database that stores the location data indicating a location of a primary usage node that receives a radio signal of the first communication service; and
    calculating the path loss on the communication path about the one or more secondary usage node based on the location of the primary usage node indicated by the location data and a location of the one or more secondary usage node.

3. The method according to claim 2, wherein
    the method is executed by a primary usage node that has access to the database, and
    the method further comprises the step of notifying the determined acceptable transmission power from the primary usage node to any node among the one or more secondary usage node.

4. The method according to claim 2, wherein
    the method is executed by a node acting as a coordinator of the second communication service among the one or more secondary usage node.

* * * * *